(12) United States Patent
Taylor

(10) Patent No.: US 11,051,386 B2
(45) Date of Patent: Jun. 29, 2021

(54) DISTRIBUTED INTELLIGENT NETWORK-BASED LIGHTING SYSTEM

(71) Applicant: LSI Industries, Inc., Cincinnati, OH (US)

(72) Inventor: Bobby Duane Taylor, Blue Ash, OH (US)

(73) Assignee: LSI Industries, Inc., Cincinnati, OH (US)

( * ) Notice: Subject to any disclaimer, the term of this patent is extended or adjusted under 35 U.S.C. 154(b) by 0 days.

(21) Appl. No.: 16/562,840

(22) Filed: Sep. 6, 2019

(65) Prior Publication Data
US 2020/0084863 A1  Mar. 12, 2020

Related U.S. Application Data

(60) Provisional application No. 62/727,582, filed on Sep. 6, 2018.

(51) Int. Cl.
| | |
|---|---|
| *H05B 47/19* | (2020.01) |
| *H04L 29/06* | (2006.01) |
| *H04W 4/33* | (2018.01) |
| *H04W 4/029* | (2018.01) |

(52) U.S. Cl.
CPC ............. *H05B 47/19* (2020.01); *H04L 69/08* (2013.01); *H04W 4/029* (2018.02); *H04W 4/33* (2018.02)

(58) Field of Classification Search
CPC ........ H05B 47/19; H04W 4/33; H04W 4/029; G04L 69/08
See application file for complete search history.

(56) References Cited

U.S. PATENT DOCUMENTS

| | | |
|---|---|---|
| 6,362,578 B1 | 3/2002 | Swanson et al. |
| 6,548,967 B1 | 4/2003 | Dowling et al. |
| 6,836,081 B2 | 12/2004 | Swanson et al. |
| 7,288,902 B1 | 10/2007 | Melanson |
| 8,098,021 B2 | 1/2012 | Wang et al. |
| 8,222,832 B2 | 7/2012 | Zheng et al. |
| 8,242,711 B2 | 8/2012 | Summerland et al. |
| 8,482,220 B2 | 7/2013 | Melanson |
| 8,525,446 B2 | 9/2013 | Tikkanen et al. |
| 8,541,952 B2 | 9/2013 | Darshan |
| 8,552,662 B2 | 10/2013 | Sun et al. |

(Continued)

*Primary Examiner* — Raymond R Chai
(74) *Attorney, Agent, or Firm* — Wood Herron & Evans LLP

(57) ABSTRACT

Systems, methods, and computer program products for commissioning and controlling a lighting system, and tracking mobile devices. The lighting system comprises a plurality of system nodes including smart nodes and light fixtures. The smart nodes communicate with the mobile devices and the light fixtures to facilitate configuration and adjustment of the lighting system. The smart nodes may also receive signals from legacy control devices, and map the received control signals to control signals that are compatible with the light fixtures. The smart nodes may transmit beacon signals having unique identifiers that are received by the mobile devices. The mobile devices may in turn communicate received signal strengths for the beacon signals back to the smart nodes. The smart nodes may store this tracking data in a database to determine where and how long the mobile devices are in a location and to provide location-based services.

13 Claims, 20 Drawing Sheets

(56) References Cited

U.S. PATENT DOCUMENTS

| | | |
|---|---|---|
| 8,587,206 B2 | 11/2013 | Sun et al. |
| 8,593,079 B2 | 11/2013 | Sadwick et al. |
| 8,643,303 B2 | 2/2014 | Zheng et al. |
| 8,742,694 B2 | 6/2014 | Bora et al. |
| 8,766,554 B1 | 7/2014 | Zhang et al. |
| 8,791,653 B2 | 7/2014 | Wendt |
| 8,890,435 B2 | 11/2014 | Bora et al. |
| 8,896,218 B2 | 11/2014 | Bora et al. |
| 8,896,232 B2 | 11/2014 | Bora et al. |
| 8,928,232 B2 | 1/2015 | Aggarwal et al. |
| 8,957,601 B2 | 2/2015 | Tikkanen et al. |
| 9,024,464 B2 | 5/2015 | Campbell |
| 9,035,563 B2 | 5/2015 | Nuhfer et al. |
| 9,055,629 B2 | 6/2015 | Chen et al. |
| 9,066,394 B2 | 6/2015 | Jacobs et al. |
| 9,084,325 B2 | 7/2015 | Zheng et al. |
| 9,113,521 B2 | 8/2015 | Gredler et al. |
| 9,167,642 B2 | 10/2015 | Yoshimoto et al. |
| 9,179,508 B2 | 11/2015 | McCune, Jr. |
| 9,179,513 B2 | 11/2015 | Shan |
| 9,192,002 B2 | 11/2015 | Morales |
| 9,192,003 B2 | 11/2015 | Chung et al. |
| 9,192,010 B2 | 11/2015 | Seo et al. |
| 9,295,144 B2 | 3/2016 | Bora et al. |
| 9,313,849 B2 | 4/2016 | Stepps et al. |
| 9,370,068 B2 | 6/2016 | Hick et al. |
| 9,392,658 B2 | 7/2016 | Chowdhury et al. |
| 9,485,816 B2 | 11/2016 | Zhang et al. |
| 9,485,833 B2 | 11/2016 | Datta et al. |
| 9,516,706 B2 | 12/2016 | Shan |
| 9,516,712 B2 | 12/2016 | Borkar et al. |
| 9,521,711 B2 | 12/2016 | Melanson et al. |
| 9,572,210 B2 | 2/2017 | Kim et al. |
| 9,572,217 B2 | 2/2017 | Ackmann |
| 9,578,699 B2 | 2/2017 | Nishizono |
| 9,585,218 B2 | 2/2017 | Pope et al. |
| 9,585,227 B2 | 2/2017 | Mohan et al. |
| 9,622,315 B2 | 4/2017 | Datta et al. |
| 9,635,726 B2 | 4/2017 | Gredler et al. |
| 9,642,204 B2 | 5/2017 | Puvanakijjakorn et al. |
| 9,713,218 B2 | 7/2017 | Zhou et al. |
| 9,730,289 B1 | 8/2017 | Hu et al. |
| 9,730,290 B2 | 8/2017 | Lee et al. |
| 9,736,913 B2 | 8/2017 | Clark et al. |
| 9,775,207 B2 | 9/2017 | Tikkanen et al. |
| 9,801,246 B2 | 10/2017 | Rodinger et al. |
| 9,820,361 B1 | 11/2017 | Turvy, Jr. et al. |
| 9,867,248 B2 | 1/2018 | Yeh et al. |
| 9,867,254 B2 | 1/2018 | Petluri et al. |
| 9,872,349 B2 | 1/2018 | Eum et al. |
| 9,883,560 B2 | 1/2018 | Garner |
| 9,900,949 B1 | 2/2018 | Zhang et al. |
| 9,900,963 B1 | 2/2018 | Doll |
| 9,974,147 B1 | 5/2018 | Davis et al. |
| 9,980,351 B2 | 5/2018 | Aggarwal et al. |
| 9,986,612 B2 | 5/2018 | Murakami |
| 9,998,907 B2 | 6/2018 | Seidman et al. |
| 10,009,980 B2 | 6/2018 | Harbers |
| 10,021,770 B2 | 7/2018 | Turvy, Jr. et al. |
| 10,051,701 B2 | 8/2018 | Williams et al. |
| 10,051,703 B2 | 8/2018 | Miskin |
| 10,051,707 B2 | 8/2018 | Deixler |
| 10,070,507 B2 | 9/2018 | Hausman, Jr. |
| 10,104,731 B2 | 10/2018 | Hu et al. |
| 2003/0234621 A1* | 12/2003 | Kriparos ............ H05B 45/3577 315/224 |
| 2011/0074302 A1* | 3/2011 | Draper ............... H05B 41/3924 315/224 |
| 2011/0195775 A1* | 8/2011 | Wells ................. G07F 17/3223 463/29 |
| 2012/0133298 A1* | 5/2012 | Campbell ............. H05B 45/37 315/250 |
| 2015/0054423 A1* | 2/2015 | Tyson ............... H05B 45/3725 315/291 |
| 2015/0195883 A1 | 7/2015 | Harris et al. |
| 2016/0100474 A1* | 4/2016 | Reh ....................... H05B 41/36 315/320 |
| 2016/0174343 A1* | 6/2016 | Kliegl .................. F21V 23/045 315/129 |
| 2017/0079121 A1* | 3/2017 | Jayawardena ......... H05B 47/19 |
| 2017/0126421 A1* | 5/2017 | Kelsey ................ H04L 61/2046 |
| 2018/0035505 A1* | 2/2018 | Foster ................... H05B 47/20 |
| 2018/0188018 A1 | 7/2018 | Brown et al. |
| 2019/0037665 A1* | 1/2019 | Cao ....................... H05B 45/20 |
| 2019/0191531 A1* | 6/2019 | Vendetti ................ F21V 23/045 |
| 2019/0394862 A1* | 12/2019 | Vendetti ................ H05B 47/19 |

* cited by examiner

DISTRIBUTED INTELLIGENT NETWORK-BASED LIGHTING SYSTEM

CROSS-REFERENCE TO RELATED APPLICATIONS

This application claims the benefit of U.S. Application No. 62/727,582 filed on Sep. 6, 2018, and entitled "Distributed Intelligent Network-Based Lighting System", the disclosure of which is incorporated by reference herein in its entirety.

BACKGROUND

This invention generally relates to lighting systems and, in particular, to methods, systems, and computer program products for managing lighting systems.

Many lighting systems include solid-state phase dimmer lighting controllers. These lighting control devices were invented in the late 1950's using solid-state electronics, and the technology has advanced over the years to use various types of solid-state devices. Due to the proliferation of electro-mechanical form factors, low cost, and the supporting industrial supply chain, these devices are used extensively in commercial and industrial lighting control applications. Phase dimmer lighting controllers operate by modifying the shape of the Alternating Current (AC) waveform from a sine wave to reduce the amount of energy contained therein, with the amount of energy approaching zero at full dimming. Dimming is accomplished by adjusting the waveform of the power signal delivered to the light from no modification to the sine wave (full brightness) to full modification (full dimming) to adjust the light emitted by the lighting system under control.

While these legacy dimmers work well enough with the incandescent lights for which they were designed, they typically do not work with solid-state lighting systems. Thus, these legacy dimmers can cause problems when new solid-state lighting systems are installed in a retro-fit situation because they are not compatible with the new solid-state lighting and/or the lighting control systems that often accompany these installations. Currently, the only known solution to this issue is to remove the legacy dimmers and replace them with new control systems, which is expensive and time consuming.

Lighting system drivers and controllers that are used in solid-state lighting systems also typically require human intervention to adjust the lights in response to changes in the environment. As often as not, this intervention fails to occur due to a lack of attention or the absence of anyone in the area to adjust the lighting. This may result in sub-optimal lighting and wasted energy. In addition, the lighting system drivers and controllers are typically not integrated with the system, which can add cost and complexity to the lighting system, as well as reduce system efficiency.

Most modern lighting control systems require lengthy and expensive commissioning after installation in order to optimize performance of the lighting system. These commissioning processes often require a large number of installers to manually survey the lighting system and develop a graphical representation that documents how the system has been configured. Once commissioned, the lighting systems are also typically difficult to reconfigure. In cases where the lighting systems are reconfigured, the contractor often fails to update the system documentation to reflect the changes to the system.

Lighting systems are commonly installed in businesses in which the owners would like to know how many customers are present, where the customers dwell, how long they dwell, and how they move through the business. Conventional systems provide this type of information using expensive visual systems and/or human observers. Visual based systems that rely on cameras can be difficult to install and often have blind spots. In addition, surveillance cameras can be difficult to hide, and often make the area unattractive and customers uncomfortable due to the feeling they are being watched. Visual based systems also lack accuracy and consistency.

Thus, there is a need for improved systems, methods, and computer program products for commissioning and controlling lighting systems that are compatible with legacy control devices, are easy to commission and update, and for monitoring the movement of persons through the area covered by the lighting system.

SUMMARY OF THE INVENTION

In an embodiment of the invention, a system node for managing a lighting system including a plurality of system nodes is provided. The system node includes one or more processors and a memory in communication with the one or more processors. The memory stores program code that, when executed by the one or more processors, causes the system node to receive an input adjusted power signal, map the input adjusted power signal to an output adjusted power signal, and transmit the output adjusted power signal to another system node.

In another embodiment of the invention, a method of controlling a lighting system is provided. The method includes receiving the input adjusted power signal at a first system node, mapping the input adjusted power signal to the output adjusted power signal, and transmitting the output adjusted power signal from the first system node to a second system node.

In another embodiment of the invention, a computer program product for controlling a lighting system is provided. The computer program product includes a non-transitory computer readable storage medium containing program code that, when executed by one or more processors, causes the one or more processors to receive the input adjusted power signal, map the input adjusted power signal to the output adjusted power signal, and transmit the output adjusted power signal to a system node.

In another embodiment of the invention, another method of controlling the lighting system is provided. This method includes receiving a sensor signal from a sensor module indicative of an environmental condition of an area proximate to the sensor module, determining a characteristic of a light to be emitted by a light fixture based at least in part on the sensor signal, and transmitting a control signal to the light fixture that causes the light fixture to emit the light having the characteristic.

In another embodiment of the invention, a lighting system is provided. The lighting system includes the sensor module, the light fixture, and the system node. The system node is in communication with the sensor module and the light fixture, and is configured to receive the sensor signal from the sensor module indicative of the environmental condition of the area proximate to the sensor module, determine the characteristic of the light to be emitted by the light fixture based at least in part on the sensor signal, and transmit the control signal to the light fixture that causes the light fixture to emit the light having the characteristic.

In another embodiment of the invention, another computer program product for controlling the lighting system is provided. The computer program product includes a non-transitory computer readable storage medium containing program code that, when executed by one or more processors, causes the one or more processors to receive the sensor signal from the sensor module indicative of the environmental condition of the area proximate to the sensor module, determine the characteristic of the light to be emitted by the light fixture based at least in part on the sensor signal, and transmit the control signal to the light fixture that causes the light fixture to emit the light having the characteristic.

In another embodiment of the invention, a method of tracking a mobile device is presented. The method includes transmitting, from each of the plurality of system nodes, a beacon signal containing an identifier that uniquely identifies the beacon signal. The method further includes receiving, from the mobile device, a communication signal including tracking data that defines the identifier and a received signal strength of each of one or more beacon signals received by the mobile device. The method determines a location of the mobile device based at least in part on the identifier and the received signal strength of the one or more beacon signals received by the mobile device, and displays the location of the mobile device on a map.

In another embodiment of the invention, a lighting system that tracks the mobile device is provided. The lighting system includes the plurality of system nodes each configured to transmit the beacon signal containing the identifier and receive the communication signal from the mobile device. The communication signal includes the tracking data that defines the identifier and the received signal strength of each of the one or more beacon signals received by the mobile device. The lighting system also includes a computer system configured to determine the location of the mobile device based at least in part on the identifier and the received signal strength of the one or more beacon signals received by the mobile device, and display the location of the mobile device on the map.

In another embodiment of the invention, a computer program product for tracking the mobile device is provided. The computer program product includes a non-transitory computer readable storage medium containing program code that, when executed by one or more processors, causes the one or more processors to transmit, from each of a plurality of system nodes, the beacon signal containing the identifier that uniquely identifies the beacon signal, receive, from the mobile device, the communication signal including the tracking data that defines the identifier and the received signal strength of each of the one or more beacon signals received by the mobile device, determine the location of the mobile device based at least in part on the identifier and the received signal strength of the one or more beacon signals received by the mobile device, and display the location of the mobile device on the map.

In another embodiment of the invention, a method of configuring the lighting system including the plurality of system nodes is provided. The method includes activating the first system node to emit an amount of light, transmit a radio frequency signal, or both emit the amount of light and transmit the radio frequency signal. The method measures at least one of a light level or a radio frequency signal level at the second system node while the first system node is active, stores the at least one of the light level or the radio frequency signal level, and adjusts a setting in the first system node based at least in part on the at least one of the light level or the radio frequency signal level.

In another embodiment of the invention, another lighting system is provided that includes the first system node, the second system node, and a computer system. The computer system is configured to activate the first system node to emit the amount of light, transmit the radio frequency signal, or both emit the amount of light and transmit the radio frequency signal. The computer system is further configured to obtain a measurement of at least one of the light level or the radio frequency signal level at the second system node while the first system node is active, store the at least one of the light level or the radio frequency signal level, and adjust the setting in the first system node based at least in part on the at least one of the light level or the radio frequency signal level.

In another embodiment of the invention, a computer program product for configuring the lighting system is provided. The computer program product includes a non-transitory computer readable storage medium containing program code that, when executed by one or more processors, causes the one or more processors to activate the first system node to emit the amount of light, transmit the radio frequency signal, or both emit the amount of light and transmit the radio frequency signal. The program code further causes the one or more processors to measure at least one of the light level or the radio frequency signal level at the second system node while the first system node is active, store the at least one of the light level or the radio frequency signal level, and adjust the setting in the first system node based at least in part on the at least one of the light level or the radio frequency signal level.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1A:
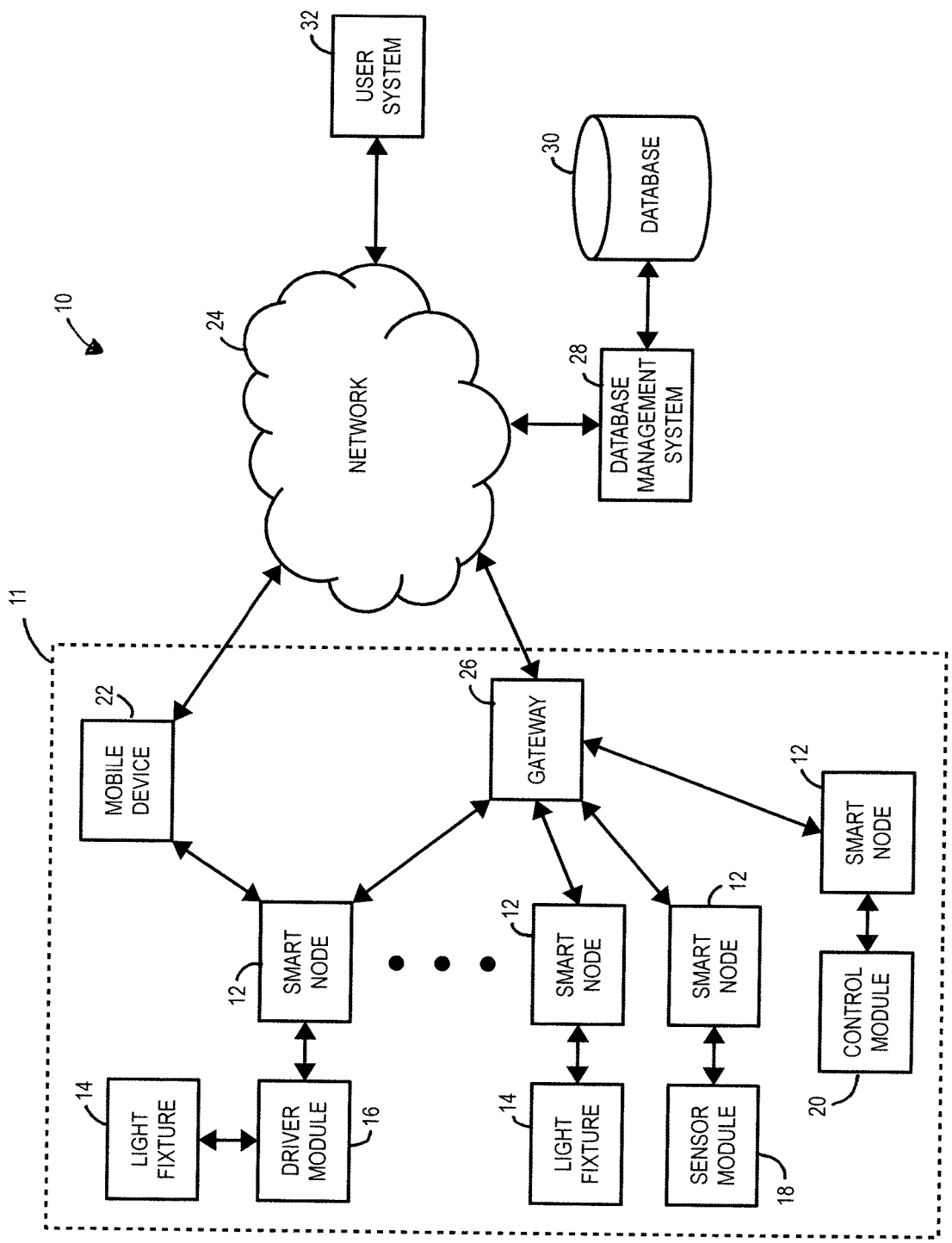
FIG. 1A is a diagrammatic view of a lighting system including a plurality of smart nodes according to an embodiment of the present invention.

Embodiments of the invention are directed to a lighting management system. The lighting management system may include smart nodes each having an embedded system with customizable lighting system driver circuitry, e.g., a Solid-State Lighting (SSL) driver. The smart nodes may also include customizable software and use external sensors and wireless systems to provide a closed-loop solution for lighting control. For example, the lighting management system may detect an amount of natural light (e.g., from windows, skylights, doors and/or other sources), and adjust the light emitted by the light fixtures in the system to reduce energy consumption.

The system may include sensors to detect the presence of individuals in the area, or the lack of individuals in the area, and adjust the lighting system to be off or have a reduced light output when no individuals are present. The system may also provide wireless information to user's mobile devices so that the users can act on various advertisements, offers and other digital information based on the user's proximity to the wireless systems. In addition, the smart nodes may include SSL driver circuitry so that a light source under the control of the smart node is controlled directly using constant current, constant voltage, or other suitable analog or digital signals.

Embodiments of the invention use custom embedded hardware and software to control the electrical power provided to light fixtures and to sense various environmental conditions such as occupancy, ambient light levels, and/or temperature. The system may control the light fixtures to increase or decrease light output based on the sensor readings. Analog or digital unidirectional or bidirectional control signals may be used to communicate with lighting control drivers. Wireless transmission methods may also be used to communicate unidirectionally or bidirectionally with various mobile devices to present coupons, offers, or other information to the user by triggering content, via wireless advertisement methods, in a custom software application on the user's device. In addition, embodiments of the invention may use wireless communication methods to allow a user's mobile device to change the lighting system and/or sensor settings anywhere in the system.

The system may also track the position of mobile devices, and use this data to map the dwell-times and path taken through an area covered by the system. This information may be useful to business owners to determine how customers are behaving and to design for traffic patterns, for example. The system may also generate various dwell, heat, and tracking maps showing where customers are spending their time, and/or that provide an indication of signal strengths in an area. The smart-nodes may be integrated into the lighting system so as to provide a grid of sensors at a location to be monitored. The grid of sensors may include smart-nodes that are closely positioned (e.g., less than 2 meters apart) to allow for high data granularity.

FIG. 1 depicts an exemplary wireless ecosystem 10 that includes a lighting system 11 comprising a plurality of smart nodes 12 each coupled to one or more of a light fixture 14, driver module 16, sensor module 18, control module 20, and/or mobile device 22. The lighting system 11 may include legacy components (e.g., dimmers and/or other control devices) and/or newly added components (e.g., solid state based light fixtures). The smart nodes 12 may be coupled to a corresponding fixture or module by a wireless link (e.g., a Bluetooth link) or a wired link (e.g., a conductive or optical cable). The smart nodes 12 may also be connected to a network 24, e.g., through a gateway 26. The gateway 26 may communicate with the smart nodes 12 using a wireless communication protocol, such as Bluetooth or a protocol based on the IEEE 802.11 standard (e.g., WiFi), and with the network 24 using another communication protocol, such as WiFi or Ethernet. The gateway 26 may thereby connect each of the smart nodes 12 to the network 24 so that the smart node can communicate with other nodes connected to the network 24. Other groups of one or more smart nodes 12 (e.g., another lighting system 11 and/or group of smart nodes 12 in another location) may be connected to the network 24 by another gateway 26.

The driver module 16 may include circuitry configured to receive an input signal from the smart node 12 and convert the received input signal to an output signal suitable for powering the light source in the light fixture 14 to which the driver module 16 is attached. For example, the input signal may be an analog signal having a value (e.g., voltage, current, frequency, duration, etc.) or digital signal defining a value (e.g., a binary number) indicative of one or more characteristics of the light (e.g., color temperature, level of luminance, spectral content, etc.) output by the light fixture 14. The driver module 16 may generate one or more drive signals (e.g., voltages or currents) that are coupled to one or more light sources (e.g., light emitting diodes) that provide the output indicated by the input signal received from the smart node 12. The drive signals may be direct current signals, pulse width modulated signals, or any other type of signal that causes one or more light sources in the light fixture 14 to output light having the desired characteristics.

The sensor module 18 may include one or more sensors that sense an environmental condition proximate to the sensor module 18 and output a sensor signal indicative thereof. For example, the one or more sensors may include sensors for detecting ambient light, motion, temperature, humidity, a received radio frequency signal level (e.g., WiFi, Bluetooth, and/or other communication signals), or any other conditions. The sensor module 18 generate one or more output signals suitable for transmission to the smart node 12 that provide the smart node 12 with information regarding the sensed levels. The output signals may include one or more analog and/or digital signals, and may be transmitted using any suitable communication protocol or at any interconnection layer, e.g., at any of the application, presentation, session, transport, network, data link, or physical layers.

The control module 20 may include a user interface (e.g., a touch screen) that allows room occupants to control the lighting in the area. The control module 20 may also include a legacy device, such as a light dimmer or switch.

A database management system 28 may collect data from the smart nodes 12 and/or mobile device 22 and store the data in the central database 30. The data stored in the central database 30 may be used for analytics, e.g., by a user system 32 authorized to access the central database 30 through the database management system 28. For example, an application on the mobile device 22 may receive data from and/or transmit data to the smart nodes 12. This data may be used to track the location of the mobile device 22 as it moves through the operating environment of the system 11. The location data may in turn be used to generate dwell maps, heat maps, or tracking maps that show user behavior.

In an embodiment of the invention, one or more of the smart nodes 12 may be configured to solve issues involving incompatibility between the legacy control devices, such as phase dimmers, and solid-state light sources and/or wireless lighting control system nodes. To this end, one or more smart nodes 12 may be configured to convert legacy phase dimmer signals received from the control module 20 to wireless signals having a communication protocol that is compatible with a controller application in another system node. For example, the controller application may be resident on another control module 20, the mobile device 22, the gateway 26, the database management system 28, the user system 32, and/or any other system node, and may be configured to provide lighting dimming and/or on/off control information to the light fixtures 14 and/or driver modules 16.

Figure 1B:
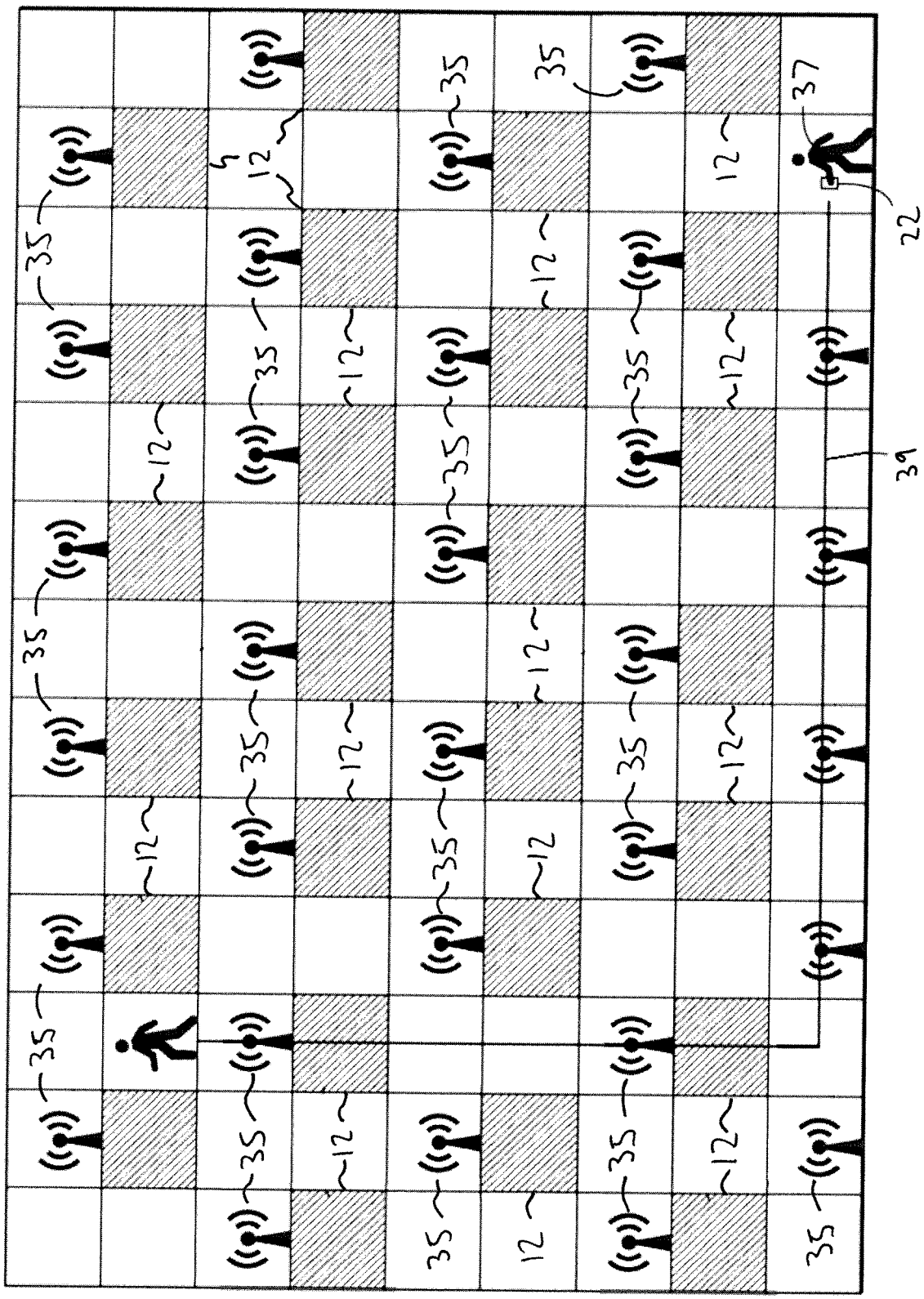
FIG. 1B is a diagrammatic view of an exemplary operating environment including the plurality of the smart nodes of FIG. 1 arranged in a grid pattern.

FIG. 1B depicts an exemplary operating environment 33 in accordance with an embodiment of the invention in which a plurality of smart nodes 12 are distributed in an area where at least a portion of the lighting system operates, e.g., at regularly spaced intervals in a drop ceiling. Each of the depicted smart nodes 12 may periodically transmit a beacon signal 35 to provide an anchor node useful for determining a position of the mobile device 22. The beacon signal 35 may be a radio frequency signal that carries an identifier unique to the transmitting node which can be received by other system nodes and/or the mobile device 22. This identifier may be unique within the ecosystem 10, the lighting system 11, or may be a Universally Unique Identifier (UUID). One protocol for transmitting beacon signals 35 that may be used by the smart nodes 12 is the iBeacon protocol, which is an implementation of Bluetooth Low Energy (BLE) beacons available from Apple, Inc. of Cupertino Calif.

The beacon signals 35 may be used, for example, by devices receiving the signals to determine their location, receive information (such as proximity marketing information or directions), and/or identify nodes with which to exchange data and/or control signals. Each beacon signal 35 may include a transmit power parameter that indicates the power at which the beacon signal 35 was transmitted. A Relative Signal Strength Indication (RSSI) indicative of the radio frequency path loss between the smart node 12 and the receiving device may be estimated by comparing the received signal strength of the beacon signal 35 with the transmitted power indicated by the transmit power parameter. Based on the RSSIs, the receiving device may estimate distances to each of the smart nodes 12 from which it received a beacon signal 35.

The mobile device 22 may determine its location based on one or more of the identifiers provided by the received beacon signals 35 and the corresponding received signal strengths thereof. For example, the unique identifier may be used to uniquely identify the smart node 12 transmitting the beacon signal 35, and the location of the smart node 12 determined based on the identifier. For example, location information associated with smart nodes 12 may be stored in a lookup table or database in the mobile device 22, the central database 30, or "in the cloud". The location of the mobile device 22 may then be estimated as that of the smart node 12 transmitting the beacon signal 35 with the lowest path loss as determined by the mobile device 22. The location of the mobile device 22 may be further narrowed by estimating the distance between the mobile device 22 and one or more smart nodes 12 using the RSSIs of the beacon signals 35. For example, the mobile device 22 may determine its approximate location by estimating its distance from each of a plurality of smart nodes 22 and using multilateration (e.g., trilateration) to determine its location relative to the smart nodes 12.

The mobile device 22 may also receive location specific information based on its location or the beacon signals it is receiving. For example, in a retail environment, an application on the mobile device 22 may receive information relevant to items displayed near the mobile device 22 based on its location or the unique identifiers provided by received beacon signals 35. A product displayed near the mobile device 22 may have an associated coupon or other related discount or promotional program. The mobile device 22 may use information contained in one or more beacon signals 35 received by the mobile device 22 to retrieve the product information and/or coupon associated with the related product.

The plurality of smart nodes 12 may be positioned within the operating environment 33 so that the position of the mobile device 22 can be updated as a person 37 carrying the mobile device 22 moves through the operating environment 33. By way of example, as the person moves along a path 39, the mobile device 22 may come within proximity of different smart nodes 12. Thus, the mobile device 22 may receive beacon signals 35 and/or location dependent information from or through different smart nodes 12 as the person moves along the path 39. This location dependent information may include a map of the area surrounding the mobile device 22 and/or instructions on which direction to go to find a product or service.

In addition to providing unidirectional communication to the mobile device 22 using beacon signals 35, the smart node 12 may also transmit communication signals to and receive communication signals from the mobile device 22 to establish bidirectional communication. To this end, the smart node 12 may provide bi-directional communication according to the Bluetooth Smart™ protocol, WiFi, or any other suitable communication protocol that the mobile device 22 can use to receive signals from and transmit signals to the smart node 12.

The mobile device 22 may communicate with one or more of the smart nodes 12 using this bi-directional communication channel to commission or otherwise configure the smart nodes 12 and/or other system nodes. For example, after installation of the smart nodes 12, a process may be implemented in which information is transmitted from the mobile device 22 to one or more of the smart nodes 12. Information associated with the smart nodes 12 may also be updated periodically in this manner.

In a retail setting, various product displays may be changed from time to time. Thus, it may be advantageous to change the information associated with one or more of the smart nodes 12. To this end, the information stored on the smart nodes 12, or at a location associated with the unique identifier (e.g., by a lookup table or database), may be changed to reflect positional changes and/or changes associated with updated product placement. To reconfigure the smart nodes 12, a process may be used in which information is communicated between the mobile device 22 and one or more of the smart nodes 12. For example, the mobile device 22 may communicate individually with each of the smart nodes 12 to provide updated information corresponding to the respective node, or may transmit information to the gateway 26 that is then forwarded to the smart nodes 12.

The smart nodes 12 may also be configured as a network with one of the smart nodes 12 or the gateway 26 acting as a controller or "master node" for the system and the remainder of the system nodes operating as slave nodes. In this embodiment, the mobile device 22 may communicate information to the master node, which may in turn communicate with the rest of the system nodes.

Figure 2:
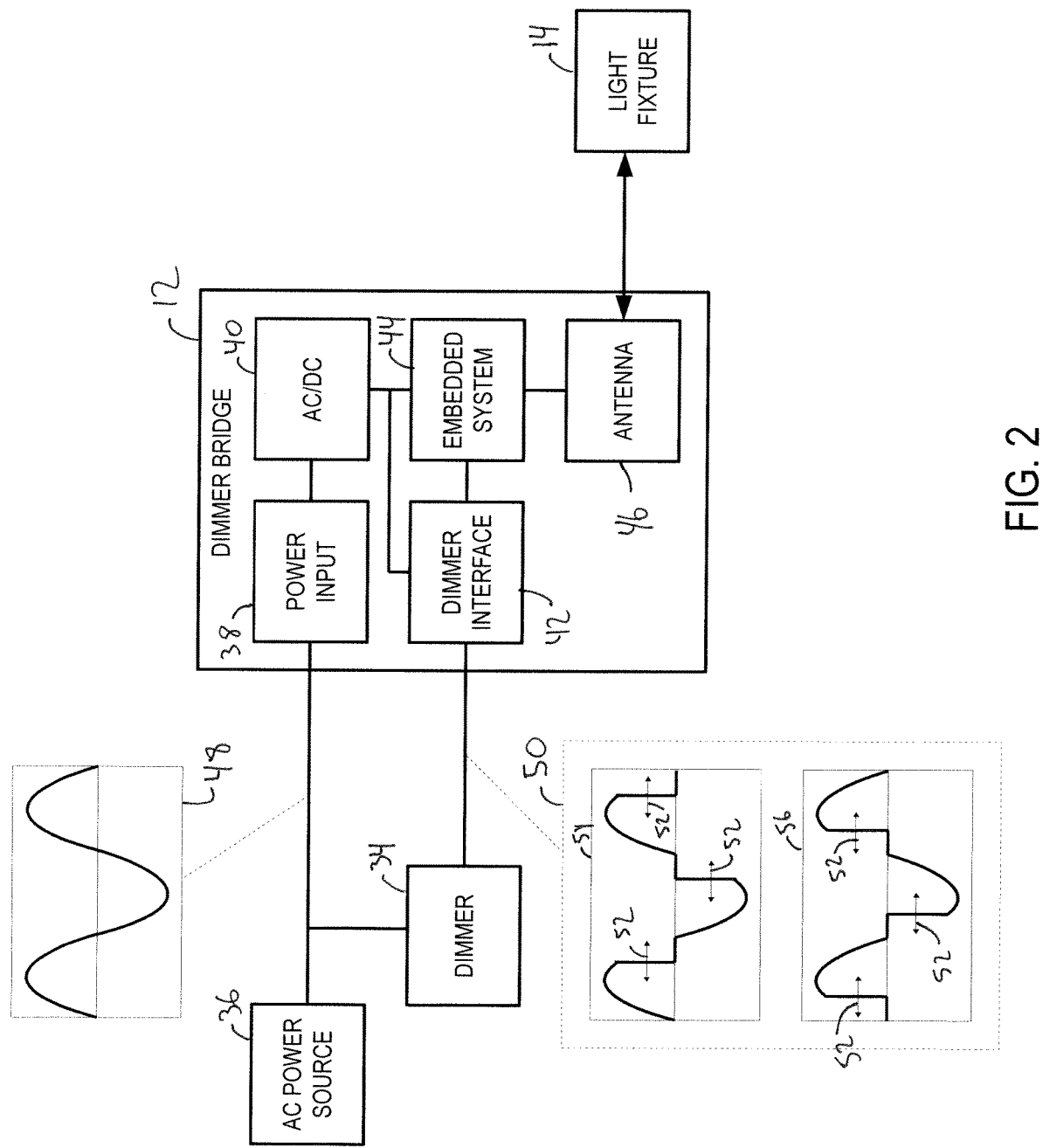
FIG. 2 is a diagrammatic view of a smart node of FIGS. 1A and 1B that is configured as a dimmer bridge.

FIG. 2 depicts an exemplary smart node 12 that is configured as a dimmer bridge and is connected to a control module 20 comprising a dimmer 34. Dimmer 34 may be a magnetic (core and coil) or electronic (solid-state) dimmer that is coupled to an AC power source 36 (e.g., a connection to the power grid). The depicted smart node 12 includes a power input module 38 (e.g., an AC Electro-Magnetic Interference (EMI) filtering and safety circuit) that couples the AC power source 36 to an AC to DC conversion module 40. The conversion module 40 in turn provides DC power to a dimmer interface module 42 and an embedded system 44. The embedded system 44 may include a processor, a memory storing instructions that are executed by the processor, and a transceiver that enables the embedded system 44 to communicate with a light fixture 14 by transmitting and receiving radio frequency signals using an antenna module 46.

The AC power source 36 may provide a power signal 48 having an electrical level (e.g., voltage and/or current level) that varies over time, e.g., according to a sinusoidal function. The dimmer 34 may receive the power signal 48 and output an adjusted power signal 50 in accordance with a level of dimming that is desired at the light fixture 14. The dimmer 34 may use a phase cut-dimming circuit to adjust the root-mean square (RMS) value of the adjusted power signal 50. This adjustment in RMS value may be achieved by cutting a portion of the phase off the front and/or back end of each half-wave of the power signal 48. The level of adjustment may be varied by adjusting the phase angle at which the cut-off occurs, as shown by arrows 52 of graphs 54, 56. Moving the cut-off phase changes the area under the waveform of the adjusted power signal 50, and thus the RMS value of the adjusted power signal 50. Conventional solid-state light sources typically do not function properly when fed with a AC power signal that has had its RMS value reduced by phase cutting. The dimmer interface module 42 solves this problem by converting the adjusted power signal 50 received from the dimmer 34 into a signal that is compatible with the light fixture 14.

Figure 3:
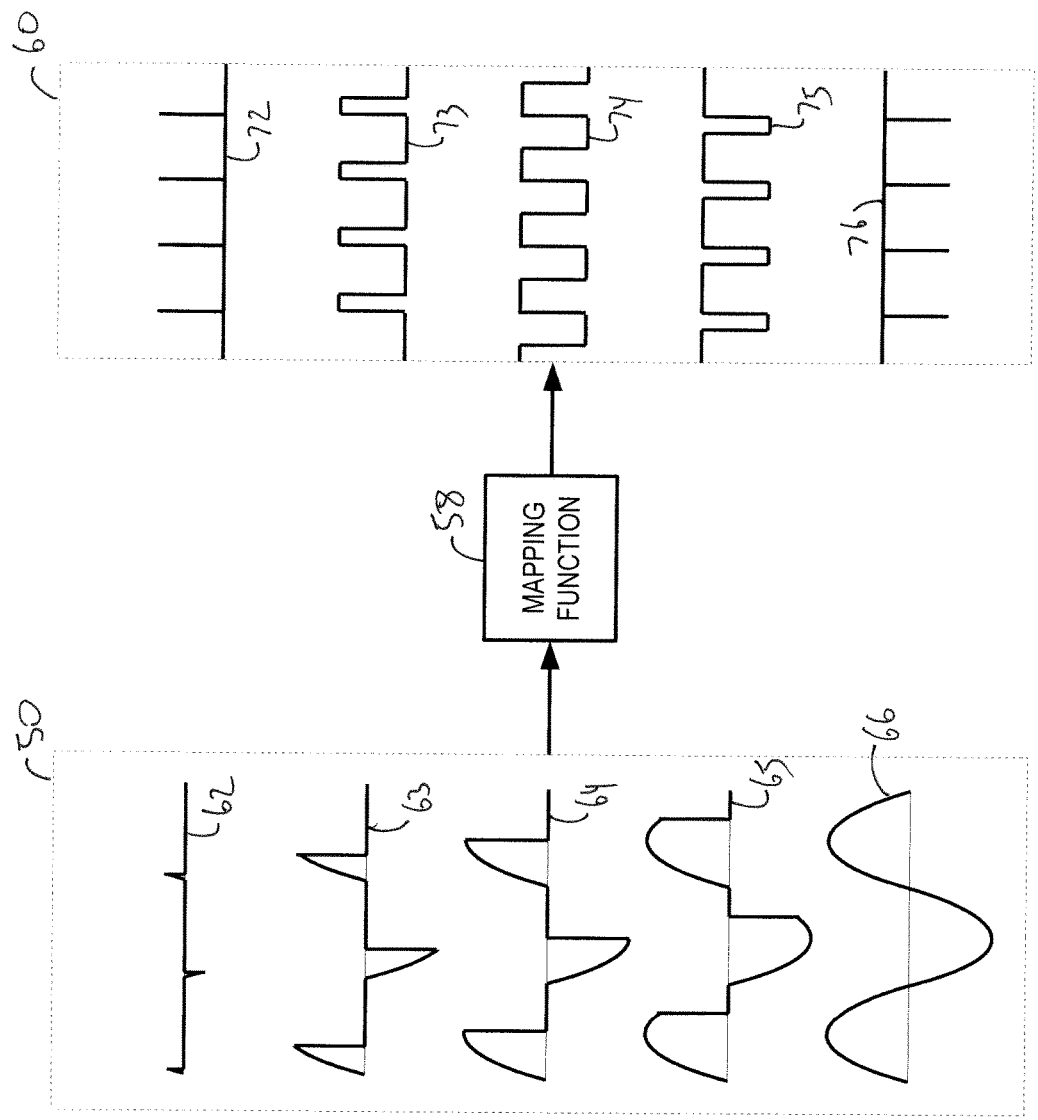
FIG. 3 is a diagrammatic view of a mapping function that may be implemented by the smart node of FIG. 2 which maps an input adjusted power signal to an output adjusted power signal.

FIG. 3 depicts a mapping function 58 that maps the input adjusted power signal 50 received from the dimmer 34 to an output adjusted power signal 60 (e.g., a pulse width modulated signal) compatible with light fixture 14. By way of example, the mapping function 58 may map a fully dimmed input adjusted power signal 50 (e.g., a phase-cut signal 62 having a 180-degree phase-cut) to a fully dimmed output adjusted power signal 60 (e.g., a pulse width modulated signal 72 having a 0% duty cycle). As the RMS amplitude of the adjusted power signal 50 increases (as depicted by exemplary phase-cut signals 62-66), the mapping function 58 may map the input adjusted power signal 50 to a correspondingly increased output adjusted power signal 60 (as depicted by exemplary pulse-width modulated signals 72-76).

The mapping function 58 may be configured so that the output adjusted power signal 60 causes the light fixture 14 to produce a light level that corresponds to the amount of light that would be output by a conventional light source (e.g., an incandescent light source) provided with the corresponding input adjusted power signal 50. To this end, the mapping function 58 may determine the RMS amplitude of the input adjusted power signal 50 relative to an undimmed power signal 48. This relative power level may then be used to determine the output adjusted power signal 60 to transmit to the light fixture 14 and/or driver module 16.

The mapping function 58 may be selectable based on the type of light source for which the dimmer 34 is designed and the type of light source (e.g., a light emitting diode) in the light fixture 14. For example, the dimmer interface module 42 may include a plurality of mapping functions 58 that may be selectively implemented based on input from a system user or based on data received from one or more of the light fixture 14 and/or the dimmer 34.

In an embodiment of the invention, the embedded system 44 of smart node 12 may receive the output adjusted power signal 60 and transmit commands to the light fixture 14 that cause the light fixture 14 to output the desired amount of light. For example, the embedded system 44 may transmit control signals to the light fixture 14 using a wireless communication protocol. In response to receiving the control signals, a driver circuit in the light fixture 14 may output a power signal that causes a light source in the light fixture 14 to output the desired amount of light. System nodes 12 configured as dimmer bridges may thereby enable light fixtures 14 to operate with legacy dimming and on/off controllers.

Figure 4A:
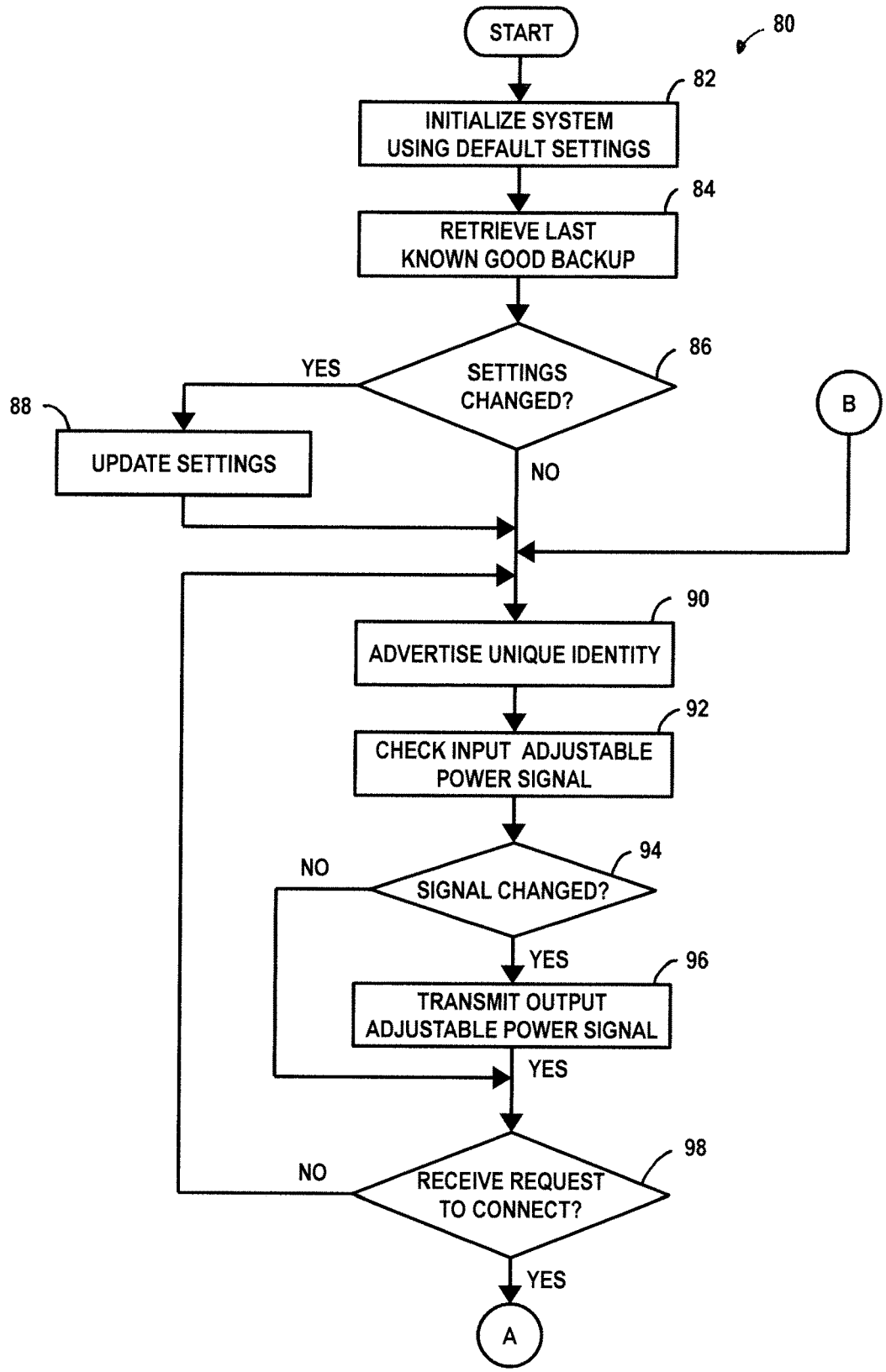
FIGS. 4A and 4B depict a flowchart of a process that may be executed by the smart node of FIG. 2 to implement the dimmer bridge.
Figure 4B:
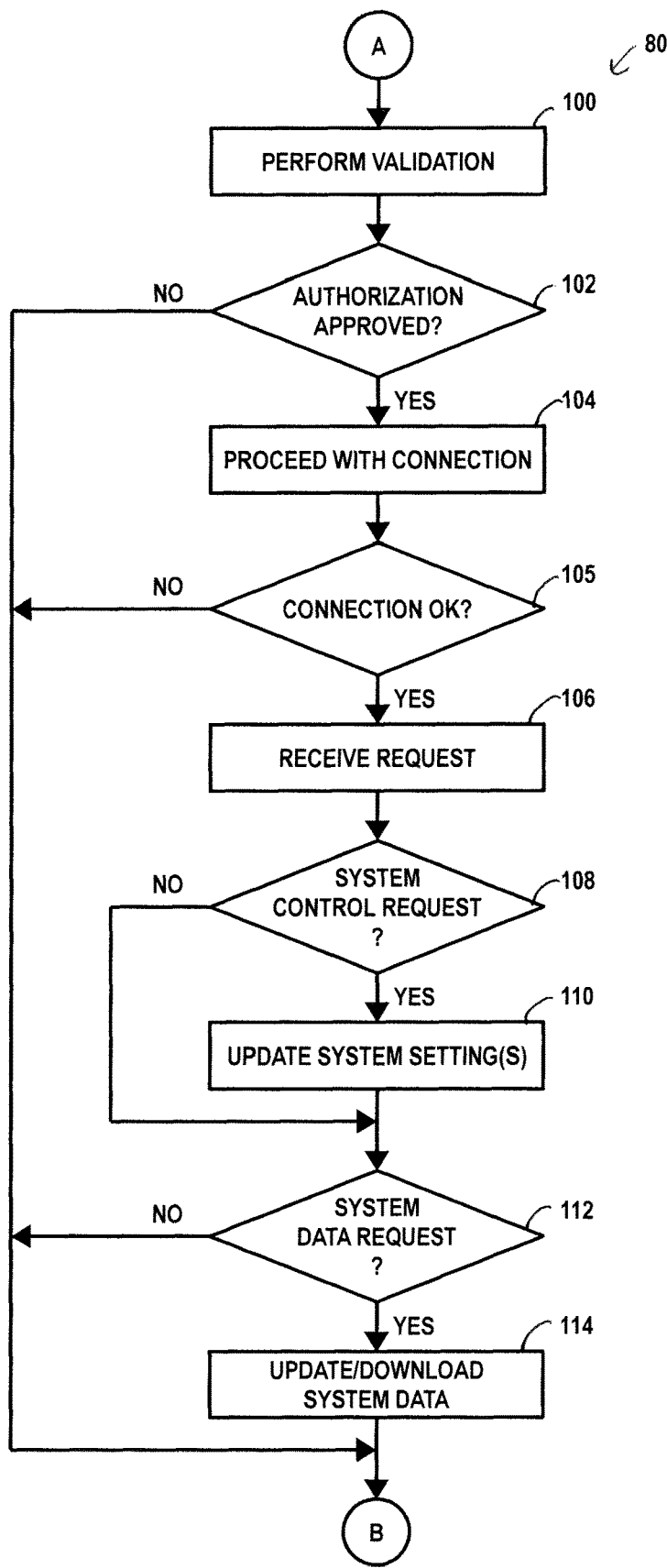

FIGS. 4A and 4B depict a flowchart illustrating a process 80 that may be implemented by the embedded system 44 of smart node 12, or any other suitable computer system of the wireless ecosystem 10. In block 82, the process 80 may initialize the system using a set of one or more default settings. This initialization may occur, for example, upon a power-up or reboot of the smart node 12 implementing the process 80. The process 80 may then proceed to block 84 and retrieve the last known good backup of the system settings. The default settings and/or the backup of the system settings may be stored locally in a memory of the embedded system 44, or retrieved from some other source, such as the mobile device 22, gateway 26, database management system 28, or user system 32.

In block 86, the process 80 may determine if any of the settings in the backup of the system settings is different than the corresponding value of the default settings. If a difference is found, it may indicate that the system settings were changed from their default values. If any of the settings have changed ("YES" branch of decision block 86), the process 80 may proceed to block 88 and update the changed setting or settings before proceeding to block 90. Updating the settings may include transmitting a request to update the setting to the system node in which the setting resides. For example, if a light output setting that defines one or more characteristics of the light emitted by a light fixture 14 is different than the default setting, the process 80 may cause the smart node 12 to transmit a request to the light fixture 14 or driver module 16 in question requesting that the system node update the setting. If none of the settings have changed ("NO" branch of decision block 86), the process 80 may proceed directly to block 90.

In block 90, the process 80 may cause the smart node 12 to advertise a unique identifier. Advertising the unique identifier may include transmitting advertising packets in the form of a beacon signal 35. The beacon signal 35 may be received by other system nodes and/or the mobile device 22 and includes an identifier unique to the transmitting node, e.g., a UUID.

In block 92, the process 80 may check the input adjusted power signal 50 to determine if there has been a change. If the signal has changed ("YES" branch of decision block 94), the process 80 may proceed to block 96, transmit an output adjusted power signal 60 to one or more light fixtures 14 and/or driver modules 16, and proceed to block 98. The output adjusted power signal 60 may be selected by the mapping function 58 to implement the change based at least in part on the identity of the light fixture 14 and/or type of light source being dimmed. Different mapping functions 58 may be selected based on the type of light source in the light fixture and/or the type of input adjusted power signal 50 provided by the dimmer 34. If the signal has not changed ("NO" branch of decision block 94), the process 80 may proceed directly to block 98.

In block 98, the process 80 may receive a request to connect from another system node and/or the mobile device 22. The request may be in the form of a Bluetooth pairing request, a request to connect using WiFi, or request to connect using any other suitable communication protocol. In response to receiving the request to connect, process 80 may proceed to block 100 (FIG. 4B) and perform a validation on the request to authenticate the requestor. Performing the validation may include receiving or requesting authentication data from the requesting node, and processing the authentication data to determine if the requestor is authorized to access the system. If the authorization fails ("NO" branch of decision block 102), the process 80 may proceed to block 90 and continue advertising the unique identifier and monitoring the input adjustable power signal 50. If the authorization is approved ("YES" branch of decision block 102), the process 80 may proceed to block 104 and allow the requesting node to connect.

Referring now to FIG. 4B, and with continued reference to FIG. 4A, in block 105, the process 80 may determine if the connection has been successful. If the connection has not been set up successfully ("NO" branch of decision block 105), the process 80 may return to block 90 to continue advertising the unique identifier and monitoring the input adjustable power signal. The process 80 may consider the connection to have failed, for example, if the connection times out prior to receiving a confirmation from requesting node. If the process determines the connection has been successful ("YES" branch of decision block 105), the process 80 may proceed to block 106.

In block 106, the process 80 may receive a request from one of the connected nodes (e.g., another smart node 12, the control module 20 and/or the mobile device 22). If the request is a system control request ("YES" branch of decision block 108), the process 80 may proceed to block 110, update one or more system settings identified in the request, and proceed to block 112. Updating system settings may include, for example, changing one or more characteristics of, or a scheduled change in the characteristics of the light emitted by one or more light fixtures 14. If the request is not a system control request ("NO" branch of decision block 108), the process 80 may proceed directly to block 112.

In block 112, the process 80 may determine if the request is or includes a request for system data. If the request is a system data request ("YES" branch of decision block 112), the process may proceed to block 114, update the system data and/or download data from the system, and return to block 90 to continue advertising the unique identifier and monitoring the input adjustable power signal. If the request is not a system data request, the process 80 may proceed directly to block 90.

Figure 5:
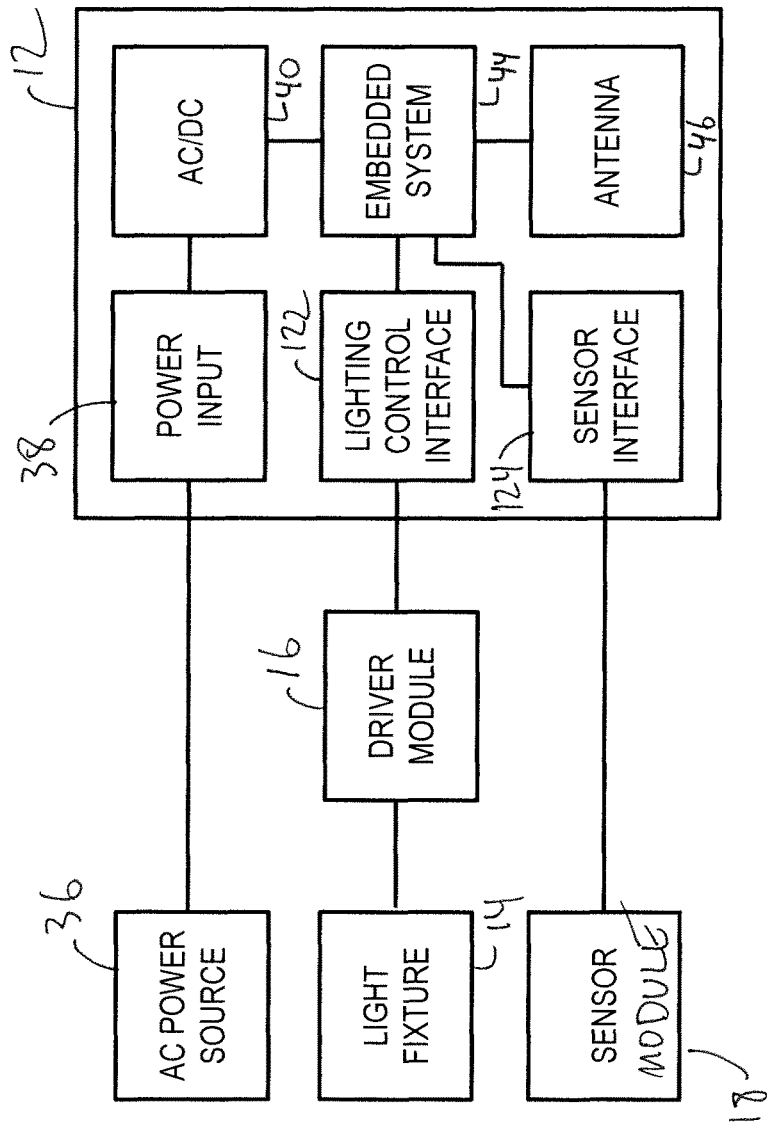
FIGS. 5 and 6 are diagrammatic views of smart nodes configured for closed-loop control of a light fixture based on input from one or more sensor modules.
Figure 6:
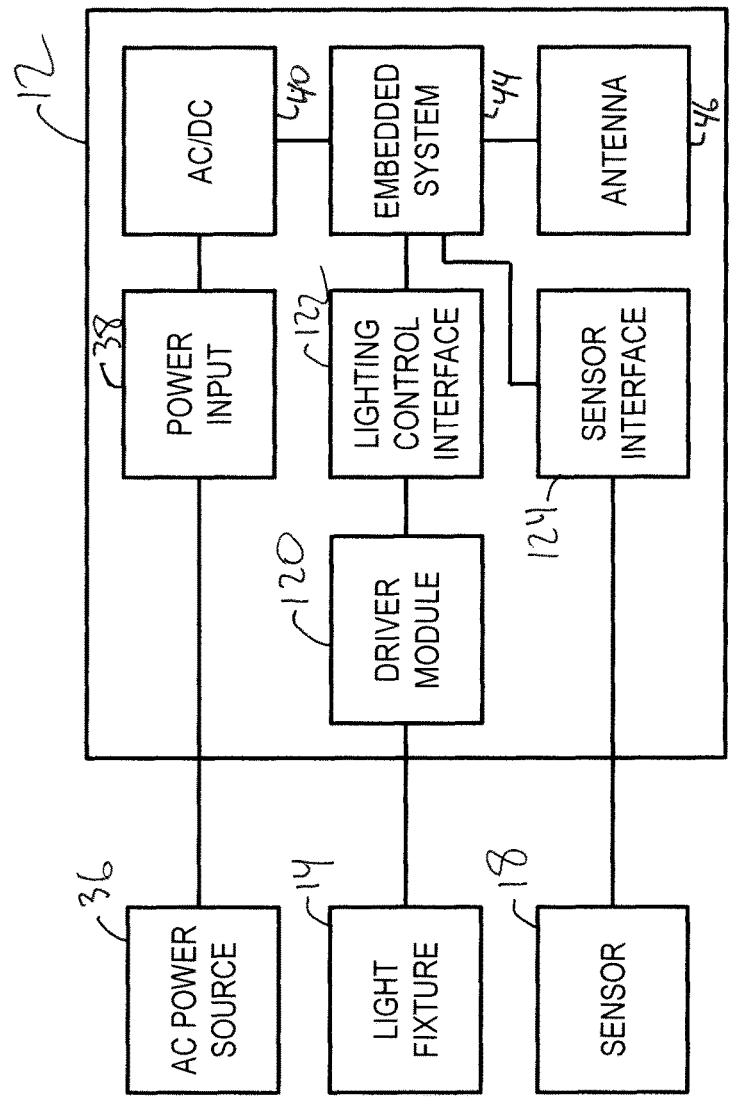

FIGS. 5 and 6 depict exemplary smart nodes 12 configured for closed-loop control of a light fixture 14 based on input from one or more sensor modules 18. In FIG. 5, the smart node 12 controls the light fixture 14 using a driver module 16. In FIG. 6, the smart node 12 has an integrated driver module 120 that provides control signals to the light fixture 14. In each of the depicted embodiments, the smart node 12 includes the power input module 38 that couples the AC power source 36 to the AC to DC conversion module 40. The conversion module 40 may provide DC power to the embedded system 44, the integrated driver module 120, a lighting control interface 122, a sensor interface 124, and/or any other modules of smart node 12 that require DC power. The embedded system 44 may communicate with other system nodes by transmitting and receiving signals using the antenna module 46.

The driver module 16, 120 may receive an input signal from the lighting control interface 122 and, based on the input signal and type of light source being driven, generate an output adjusted power signal 60 as described above with respect to FIGS. 2 and 3. The sensor interface 124 may be configured to receive sensor signals from the sensor module 18, extract the information contained therein, and provide this information to the embedded system 44.

Figure 7A:
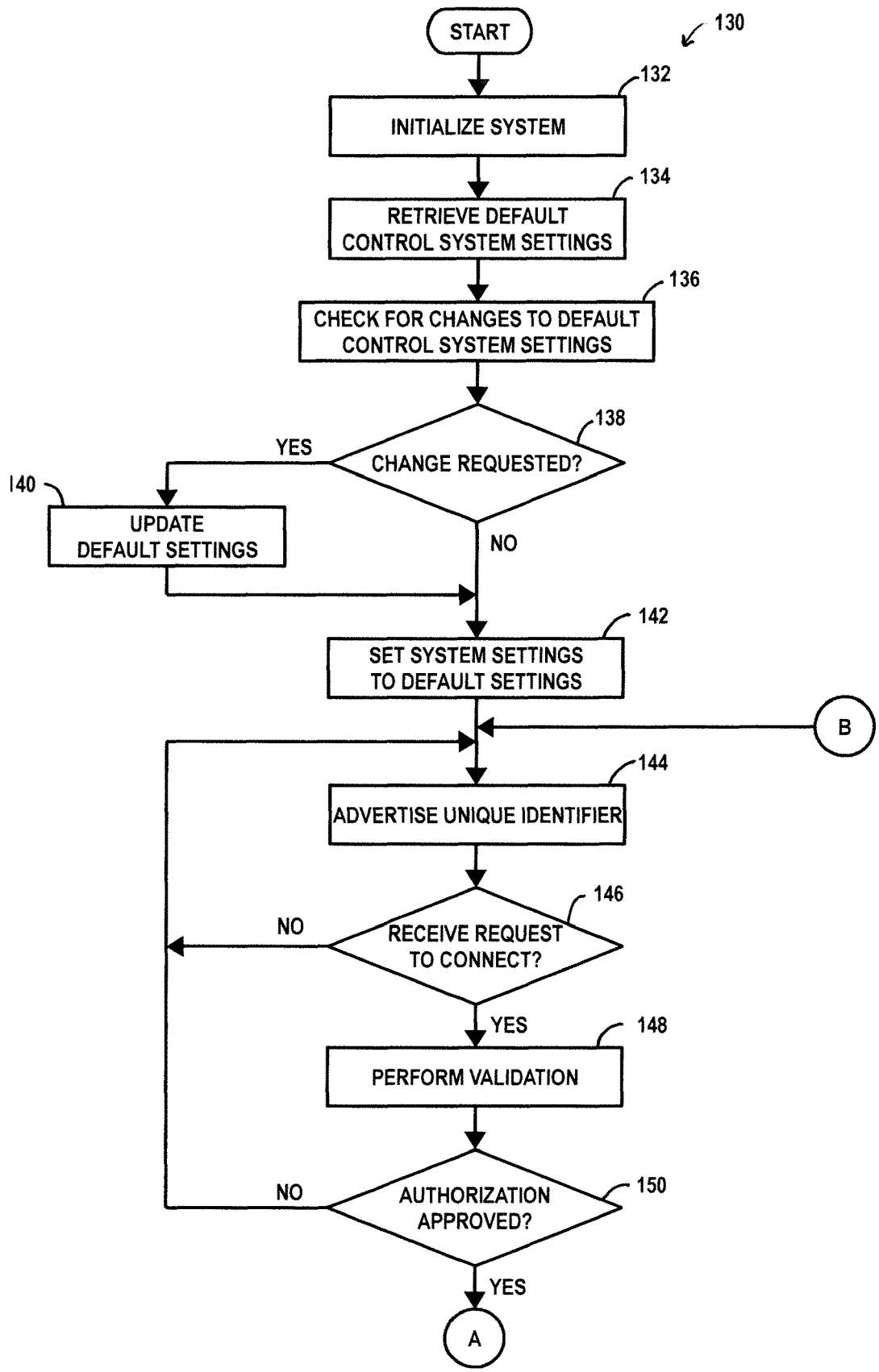
FIGS. 7A-7F depict a flowchart of a process that may be executed by the smart node of FIGS. 5 and 6 to implement certain features of the closed-loop control.

FIGS. 7A-7F depict flowcharts illustrating a process 130 that may be implemented by the embedded system 44 of a smart node 12 and/or other computer systems of the wireless ecosystem 10. Referring now to FIG. 7A, in block 132, the process 130 may initialize the system. This initialization may include powering up, assigning a network address, and/or establishing contact between each node in the system and a master node. The master node may be a designated smart node 12, the mobile device 22, the gateway 26, or some other system node.

Once the system has been initialized, the process 130 may proceed to block 134 and retrieve default control system settings, e.g., from the central database 30 or other storage location accessible to the master node. Control system settings may include settings that define one or more characteristics of the light emitted by each light fixture 14 in the system under various conditions, such as time of day, season of the year, room occupancy, ambient light levels, etc.

In block 136, the process 130 may check for changes to the default control system settings. If changes to the default control system changes have been requested ("YES" branch of decision block 138), the process 130 may proceed to block 140, update the default settings, and proceed to block 142. If no changes have been requested ("NO" branch of decision block 138), the process 130 may proceed directly to block 142. In block 142, the process 130 may set the system settings to the default settings.

In block 144, the process 130 may cause one or more of the smart nodes 12 to advertise one or more unique identifiers. As described above, advertising a unique identifier may include transmitting advertising packets in the form of a beacon signal 35 that can be received by the mobile device 22 and/or any other system nodes. In some embodiments, a single smart device 12 may advertise multiple unique identifiers, e.g., by transmitting different beacons having different coverage areas.

In block 146, the process 130 may receive a request to connect to the system. This request may be received, for example, at one of the smart nodes 12 and/or the gateway 26. In response to receiving the request to connect, the process 130 may proceed to block 148 and attempt to authorize the requestor by validating the request. If the authorization fails ("NO" branch of decision block 150), the process 130 may return to block 144. If the authorization is approved ("YES" branch of decision block 150), the process 130 may proceed to block 152 (FIG. 7B) and allow the requesting node and/or application to connect to the system.

Figure 7B:
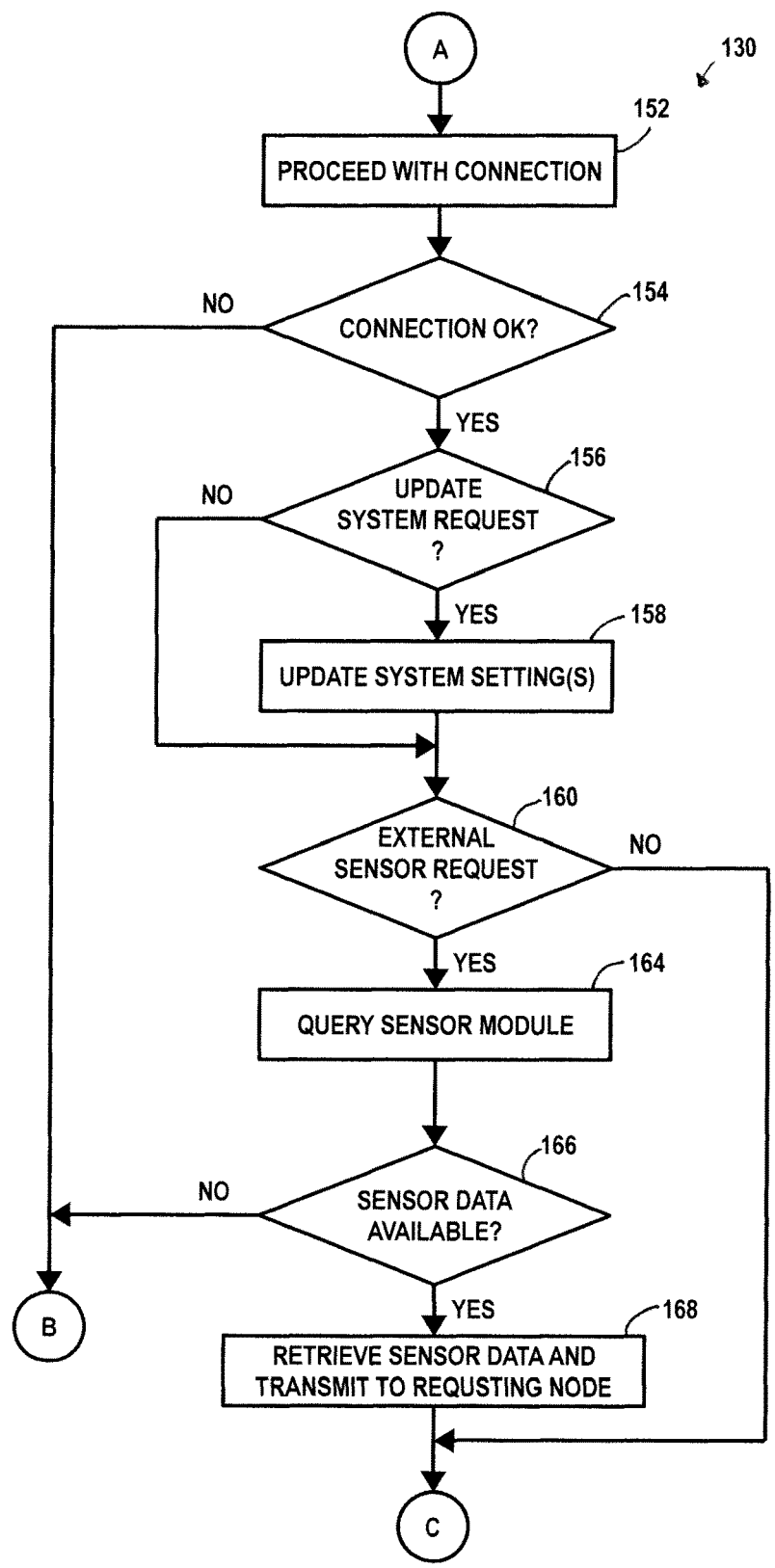

Referring now to FIG. 7B, and with continued reference to FIG. 7A, in block 154, the process 130 may determine if the requesting node has successfully connected. If the connection has not been successful ("NO" branch of decision block 154), the process 130 may return to block 144 and continue advertising unique identities. If the process 130 determines the connection has been successful ("YES" branch of decision block 154), the process 130 may proceed to block 156.

As shown in block 156, the process 130 may receive a request from a connected device or application, e.g., a system control application, data collection application, or system commissioning application resident on the master node, database management system 28, or user system 32. If the request is an update system request ("YES" branch of decision block 156), the process 130 may proceed to block 158, update one or more system settings identified in the request, and proceed to block 160. If the request is not an update system request ("NO" branch of decision block 156), the process 130 may proceed directly to block 160.

In block 160, the process 130 may determine if the request is for sensor data, e.g., sensor data from a sensor module 18 or sensors imbedded in some other system node. If sensor data has not been requested ("NO" branch of decision block 160), the process 130 may proceed to block 162. If the request is for sensor data ("YES" branch of decision block 160), the process 130 may proceed to block 164 and query a sensor module 18 or other system node that generates the data that is being requested. If the requested sensor data is not available ("NO" branch of decision block 166), the process 130 may return to block 144 and continue advertising the unique identifier. If the sensor data is available ("YES" branch of decision block 166), the process 130 may proceed to block 168.

In block 168, the process 130 may retrieve the sensor data from the node in question and forward the data to the requesting node or application. The process 130 may also receive an acknowledgment from the requesting node or application when the transfer of the sensor data is complete. Sensor data may include data indicative of a condition at the system node collecting the data, such as one or more characteristics of the ambient light at the node, motion (e.g., Passive Infrared Sensor (PIR), radar, ultrasonic, and/or audio readings), temperature and/or humidity levels, transmissions from devices (e.g., sensing of Bluetooth, Wi-Fi, RFID, and/or NFC signals and/or RSSI data), and/or images (e.g., a video signal received from a security camera). By way of example, this data may be transmitted to the database management system 28 and stored in the central database 30 along with other system data for analysis and/or later retrieval.

Figure 7C:
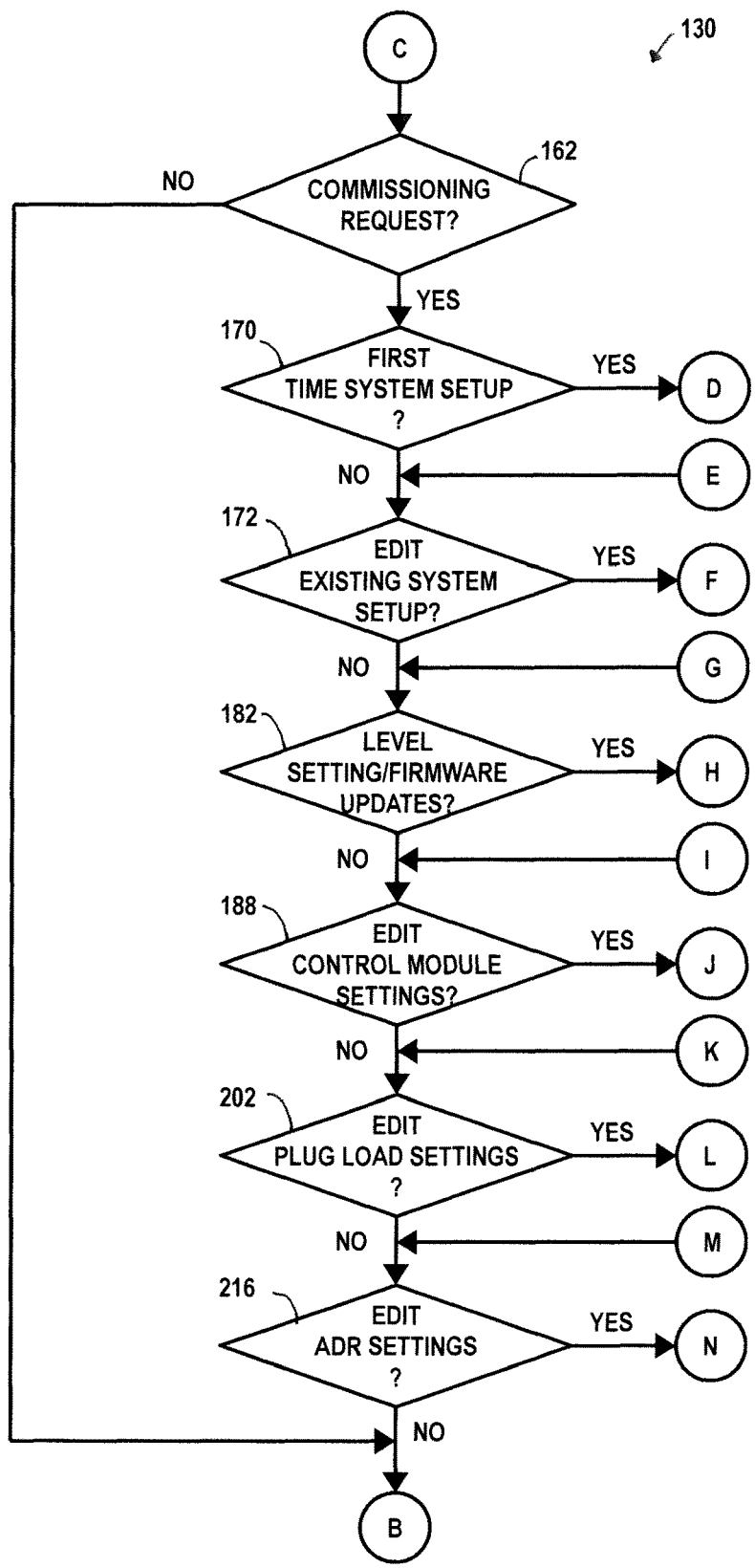

Referring now to FIG. 7C, and with continued reference to FIGS. 7A and 7B, in block 162, the process 130 may determine if the request is a request to commission the system. If the request is not a request to commission the system ("NO" branch of decision block 162), the process 130 may return to block 144 to continue advertising unique identities. If the request is a request to commission the system ("YES" branch of decision block 162), the process 130 may proceed to block 170 and begin the commissioning process.

In block 170, the process 130 may determine if the commissioning request is for a first-time system setup, e.g., a request to commission a newly installed system. If the request is not for a first-time system setup ("NO" branch of decision block 170), the process 130 may proceed to block 172. If the request is for a first-time system setup ("YES" branch of decision block 170), the process may proceed to block 174.

Figure 7D:
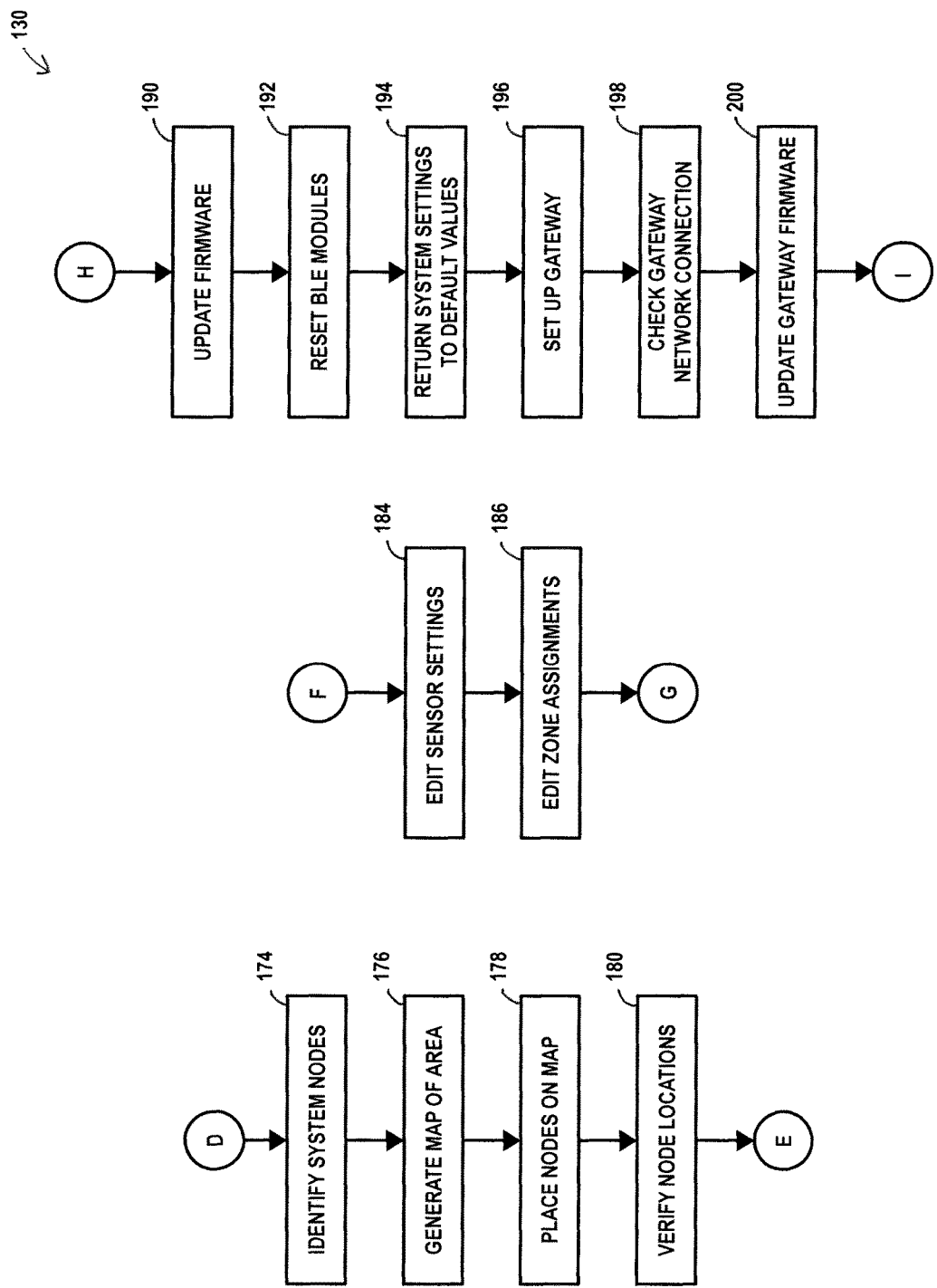

Referring now to FIG. 7D, and with continued reference to FIGS. 7A-7C, in block 174, the process 130 may identify the system nodes. To this end, the master node may broadcast a message requesting each system node that receives the message respond to the master node with information about itself, e.g., node type, capabilities, identity, firmware version, etc. In an alternative embodiment, the master node may identify system nodes by sequentially transmitting messages to network addresses known to be used by the system. In either case, each system node that receives a message from the master node may respond with a message that provide an address (e.g., a Media Access Control (MAC) and/or Internet Protocol (IP) address) or other identifier (e.g., a UUID) that enables the master node to identify messages from and transmit messages to that system node. If the responding system node knows its location, the response may also include location information, e.g., distances from neighboring system nodes.

In block 176, the process 130 may generate a map of the area occupied or covered by the system. Generating the map may include, for example, capturing image or proximity sensor data from one or more system nodes, and using this data to determine the dimensions and/or locations of the spaces proximate to the system nodes in question. Map data may also be received in the form of architectural drawings or other data that is loaded into a system node, e.g., the database management system 28 or other computer system running a commissioning application.

In response to determining the locations of the system nodes and generating the area map, the process 130 may proceed to block 178 and place the system nodes on the map. The process 130 may then proceed to block 180 and verify the locations of the system nodes. Verifying the locations of the system nodes may include transmitting requests to system nodes for data regarding the direction to and distance from neighboring nodes, RSSI data and/or arrival times of beacon signals 35 received at the node, or any other data that may be used to determine the position of the node. Once the system node locations have been verified, the process 130 may proceed to block 172.

In block 172, the process 130 may determine if the commissioning request includes changes to an existing system setup. If the commissioning request does not include changes to the existing system setup ("NO" branch of decision block 172), the process 130 may proceed to block 182. If the commissioning request does include changes to the existing system setup ("YES" branch of decision block 172), the process 130 may proceed to block 184.

In block 184, the process 130 may determine if any of the changes are to sensor settings, and if so, edit the identified settings. Exemplary changes may include changes to the settings of occupancy sensors (e.g., threshold levels for determining if the area monitored by the sensor is occupied), ambient light sensors (e.g., thresholds for daylight harvesting and/or ambient light levels), and/or changes to other sensors.

In block 186, the process 130 may determine if any of the changes are to system node zone assignments, and if so, edit the identified settings. Exemplary changes may include changing the zone assignment of a light fixture 14 or sensor module 18 from one zone to another. This may allow the system to determine how system nodes are controlled (e.g., the output of one or more light fixtures 14 in an area defined by a zone) and what data (which ambient light levels) this control is based on. Once the changes have been implemented, the process 130 may proceed to block 182.

In block 182, the process 130 may determine if the commissioning request includes any changes to system level setting or firmware updates. If the commissioning request does not include any system level or firmware updates ("NO" branch of decision block 182), the process 130 may proceed to block 188. If the commissioning request includes one or more system level or firmware updates ("YES" branch of decision block 182), the process 130 may proceed to block 190.

In block 190, the process 130 may determine if there are any firmware updates to implement, and if so, implement the updates. Firmware updates may be implemented, for example, by identifying the system nodes to be updated and transmitting the firmware updates to the identified system nodes. The process 130 may then proceed to block 192 and determine if the commissioning request includes a request to reset each BLE module in the system. If so, the process 130 may request each system node having a BLE module reset the BLE module. The process 130 may then proceed to block 194 and determine if the commissioning request includes a request to return the system settings to their default values. If so, the process 130 may confirm each system setting is set to its default value, or if not, reset the setting to its default value.

The process 130 may then proceed to block 196 and determine if the commissioning request includes a request to set up the gateway 26. If so, the process 130 may proceed to set up the gateway 26. The process 130 may then proceed to block 198 and determine if the commissioning request includes a request to check the connection between the gateway 26 and one or more external networks, e.g., an Internet Service Provider (ISP). If so, the process 130 may proceed to check the gateway connection, e.g., by sending data packets to a known network address and determining if a reply is received in a timely manner. In block 200, the process 130 may determine if there are any firmware updates to the gateway 26. If there is a firmware update, the process 130 may update the firmware in the gateway 26. Once the updates and settings requested by the commissioning request have been implemented, the process 130 may proceed to block 188.

In block 188, the process 130 may determine if the commissioning request includes changes to any settings in any of the control modules 20. If the commissioning request does not include any changes to a control module 20 ("NO" branch of decision block 188), the process 130 may proceed to block 202. If the commissioning request includes one or more changes to a control module 20 ("YES" branch of decision block 182), the process 130 may proceed to block 204.

Figure 7E:
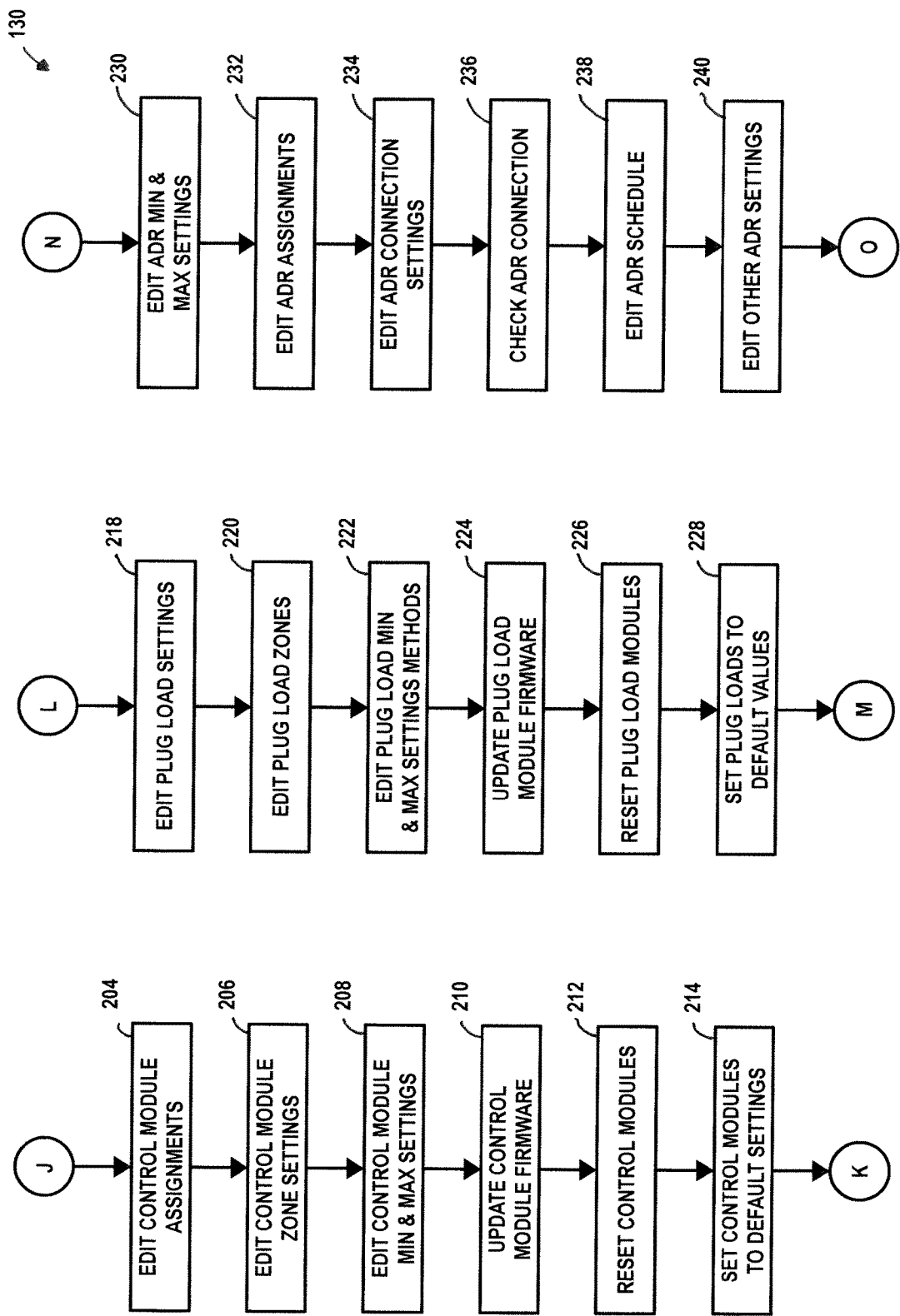

Referring now to FIG. 7E, and with continued reference to FIGS. 7A-7D, in block 204, the process 130 may determine if the commissioning request includes any changes to control module assignments, e.g., any changes that re-assign a switch, dimmer, or other control module 20 to control a different light fixture 14. If the commissioning request includes a change to a control module assignment, the process 130 may implement the change, e.g., by updating a setting in the smart node 12 connected to the control module 20 so that the smart node 12 transmits control signals to a new set of one or more light fixtures 14 and/or driver modules 16. By coupling control modules 20 to the system through a smart node 12, the system can be reconfigured so that the control module 20 controls the output of different light fixtures by changing settings in the smart node 12. Advantageously, this feature may allow legacy control modules 20 to be reassigned without the need for physical rewiring.

In block 206, the process 130 may determine if the commissioning request includes any changes to control module zone assignments, and if so, edit the identified settings. Exemplary changes may include changing the zone assignment of a control module 20 from one zone to another. This may allow the system to determine what light fixtures are controlled (e.g., the output of one or more light fixtures 14 in an area defined by a zone) by the control module 20 in question.

In block 208, the process 130 may determine if the commissioning request includes a request to edit the minimum and/or maximum settings for a control module 20. If so, the process 130 may change the minimum and/or maximum settings of the control modules 20 in question. In block 210, the process 130 may determine if there are any firmware updates to any of the control modules 20. If there are any firmware updates, the process 130 may update the firmware in the control modules 20 in question. The process 130 may then proceed to block 212 and determine if the commissioning request includes a request to reset any of the control modules 20. If so, the process 130 may cause each control module 20 in the system identified in the commissioning request to be reset. In block 214, the process 130 may determine if the commissioning request includes a request to set the settings in any of the control modules 20 to their default settings. If so, the process 130 may cause the settings in each control module 20 in the system identified in the commissioning request to be changed to the default settings. Once the updates and settings to the control modules 20 requested by the commissioning request have been implemented, the process 130 may proceed to block 202.

In block 202, the process 130 may determine if the commissioning request includes changes to any plug load settings in the system. Plug load may refer to the power drawn from the AC power source 36 by one or more system nodes, either individually or grouped into a zone. If the commissioning request does not include any changes to the plug load settings ("NO" branch of decision block 202), the process 130 may proceed to block 216. If the commissioning request includes one or more changes to the plug load settings ("YES" branch of decision block 202), the process 130 may proceed to block 218.

In block 218, the process 130 may determine if the commissioning request includes a request to edit the plug load settings for any of the system nodes. If so, the process 130 may change the plug load settings in question. In block 220, the process 130 may determine if the commissioning request include any changes to the plug load zones. If there are any changes to the plug load zones, the process 130 may implement the changes. The process 130 may then proceed to block 222 and determine if the commissioning request includes a request change any of the plug load minimum and/or maximum settings. If so, the process 130 may update the settings before proceeding to block 224. In block 224, the process 130 may determine if there are any firmware updates to any of the plug load monitoring modules. If there are any firmware updates, the process 130 may update the firmware in the plug load monitoring modules in question. The process 130 may then proceed to block 226 and determine if the commissioning request includes a request to reset any of the plug load monitoring modules. If so, the process 130 may cause each plug load monitoring modules in the system identified in the commissioning request to be reset. In block 228, the process 130 may determine if the commissioning request includes a request to set any of the plug load settings to their default settings. If so, the process 130 may cause the plug load settings identified in the commissioning request to be changed to the default settings. Once the updates and settings to the plug loads requested by the commissioning request have been implemented, the process 130 may proceed to block 216.

In block 216, the process 130 may determine if the commissioning request includes changes to any Automated Demand Response (ADR) settings in the system. If the commissioning request does not include any changes to ADR settings ("NO" branch of decision block 216), the process 130 may proceed to block 144 and continue advertising unique identities. If the commissioning request includes one or more changes to the ADR settings ("YES" branch of decision block 216), the process 130 may proceed to block 230.

In block 230, the process 130 may determine if the commissioning request includes a request change any of the ADR minimum and/or maximum settings. If so, the process 130 may update the settings before proceeding to block 232. In block 232, the process 130 may determine if the commissioning request includes a request to change any of the ADR assignments. If so, the process 130 may update the ADR assignment settings before proceeding to block 234. In block 234, the process 130 may determine if the commissioning request includes a request to change any of the ADR connection settings, e.g., updating the utility company server from which requests to shed electrical load are received. If so, the process 130 may update the ADR connection settings before proceeding to block 236. In block, 236, the process may determine if the commissioning request includes a request to check the ADR connection. If so, the process 130 may proceed to check the ADR connection, e.g., by sending data packets to the network address of the utility company server and determining if a reply is received in a timely manner before proceeding to block 238. In block 238, the process 130 may determine if the commissioning request includes a request to change the ADR schedule, e.g., which times of the day or week during which the system should shed electrical load. If so, the process 130 may proceed to change the ADR schedule before proceeding to block 240. In block 240, the process 130 may determine if the commissioning request includes a request to change any other ADR settings. If so, the process 130 may proceed to change the ADR settings before proceeding to block 242 to start wireless tracking of mobile devices 22 within the area covered by the system 11.

Figure 7F:
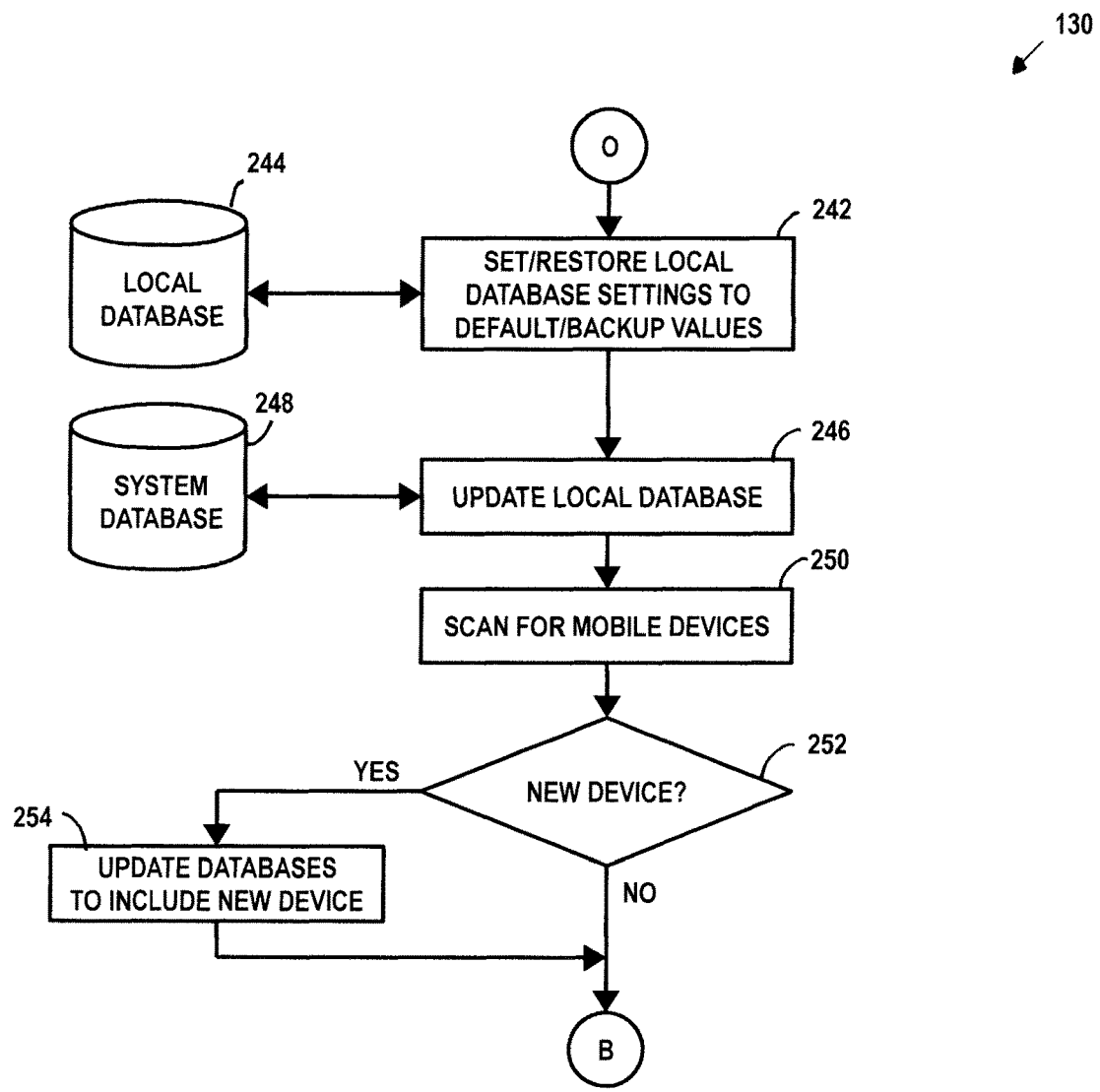

Referring now to FIG. 7F, and with continued reference to FIGS. 7A-7E, in block 242, the process 130 may set the settings in a local database 244 of tracking data to their system default values (e.g., for a first-time set up) or restore the settings of the local database 244 from a previous backup (e.g., if the local database has been previously set up). The local database 244 may be maintained in the computer system on which a device tracking application is running, e.g., the master node, a mobile device 22 operated by a system operator, user system 32, or other suitable computer system.

Once the settings of local database 244 have been set, the process 130 may proceed to block 246. In block 246, the process 130 may connect to a system database 248 of tracking data (e.g., a database maintained by the gateway 26 and/or the central database 30). Once connected, the process 130 may update the tracking data in the local database 244 and proceed to block 250. Updating the tracking data may include, for example, downloading electronic addresses (e.g., MAC or IP addresses) of each smart node 12 and/or mobile device 22 in the system 11.

In block 250, the process 130 may scan for mobile devices 22. Scanning for mobile devices 22 may include querying each of the smart nodes 12 of system 11 and requesting electronic addresses of each mobile device 22 that has been detected by the smart node 12. To this end, the process 130 may select an initial smart node 22, e.g., the smart node 22 having the lowest electronic address of the smart nodes 22 in the system 11. Once the initial smart node 12 has been queried, the process 130 may proceed to query each of the remaining smart nodes 12, e.g., by sequentially querying smart nodes 12 in increasing value of their electronic addresses. In response to receiving the tracking data queries, the smart nodes 12 may transmit tracking data that includes the electronic address, RSSI values (e.g., RSSI of a signal received from the mobile device 22 and/or of the beacon signal transmitted by the smart node 22 when received by the mobile device 22), and time stamp for each mobile device 22 within range of the smart node 12.

In block 252, the process 130 may determine if there are any new mobile devices 22 in the system 11. New mobile devices may be identified, for example, by comparing the electronic addresses of the mobile devices 22 in the tracking data received from the smart nodes 12 to a list of electronic addresses in the local database 244 and/or system database 248. If a new mobile device 22 is detected ("YES" branch of decision block 252), the process 130 may proceed to block 254 and update the local database 244 and/or system database 248 with the tracking data from the new mobile device 22. By way of example, the process 130 may update the local database 244 each time a new device is detected, and update the system database 248 once the scan for new mobile devices 22 has finished. Once the databases have been updated, the process 130 may proceed to block 144 to continue advertising unique identities. If no new mobile devices are detected ("NO" branch of decision block 252), the process 130 may proceed directly to block 144 without updating the databases.

Figure 8A:
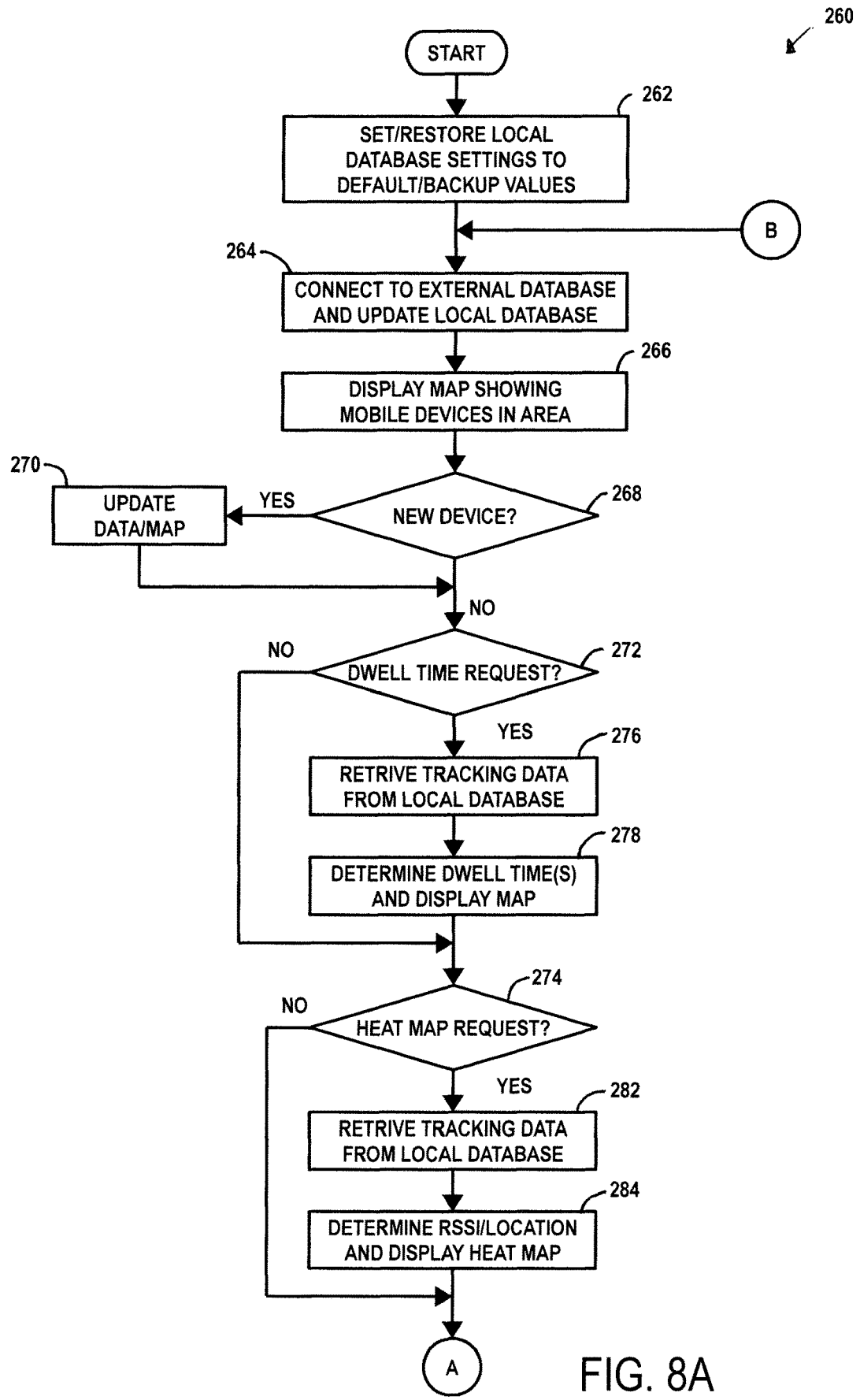
FIGS. 8A and 8B depict a flowchart of a process that may executed by the smart nodes of FIGS. 1A and 1B to track a mobile device.
Figure 8B:
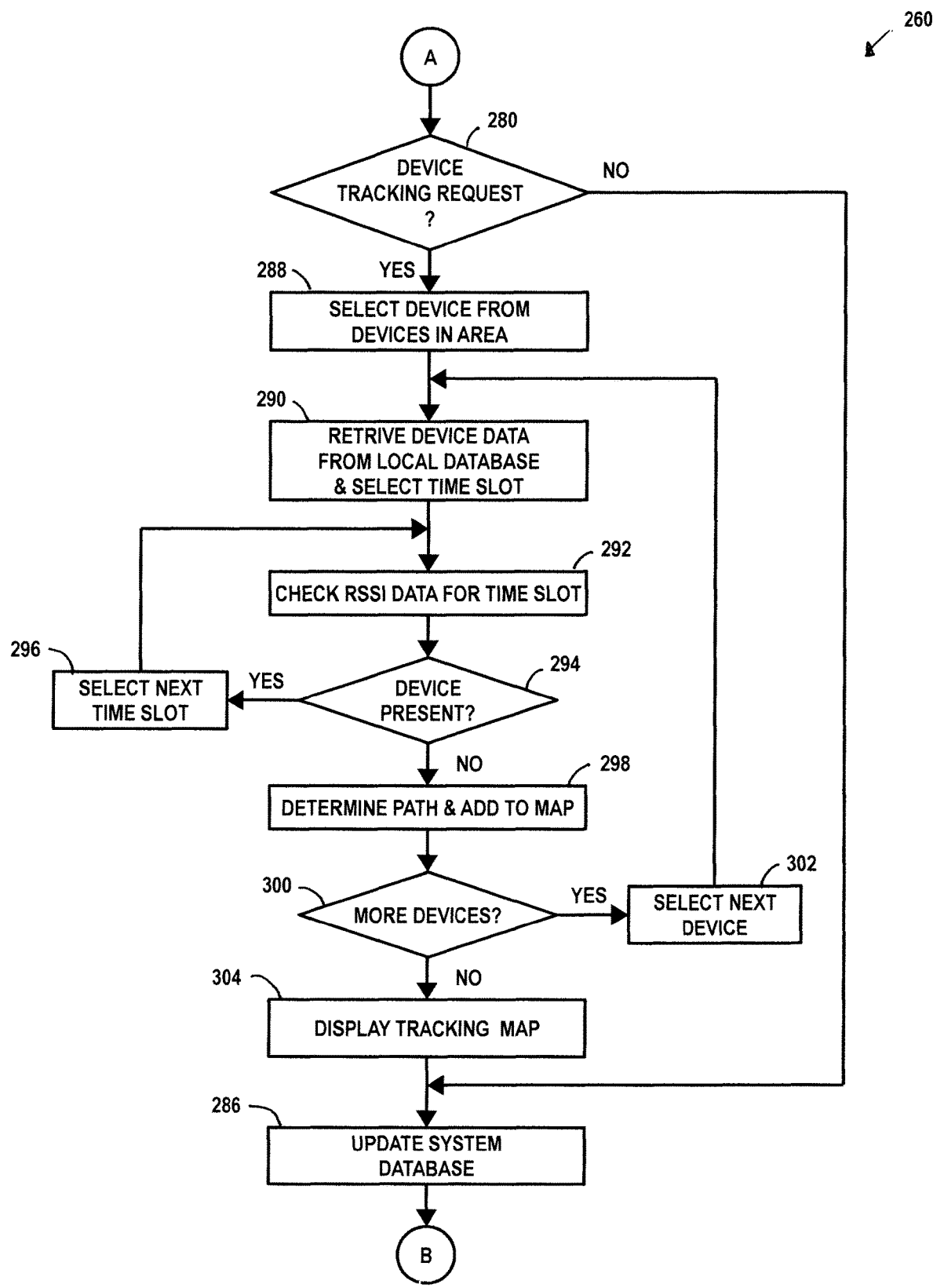

FIGS. 8A and 8B depict flowcharts illustrating a process 260 that may be implemented by the embedded system 44 of a smart node 12 and/or other computer systems of the wireless ecosystem 10 to map the system 11. Referring now to FIG. 8A, in block 262, the process 260 may set the system settings in the local database 244 to their system default values (e.g., for a first-time set up) or restore the settings of the local database 244 from a previous backup (e.g., if the local database has been previously set up).

Once the system settings of local database 244 have been set, the process 260 may proceed to block 264. In block 264, the process 130 may connect to the system database 248, update the system data in the local database 244, proceed to block 266, and display a map showing mobile devices 22 in the system 11 or a portion thereof. The system data may include data defining the physical layout (e.g., floorplan) and/or locations of the system nodes, as well as the locations of mobile devices 22 known to be present in the system 11. The map of the mobile devices 22 may be generated based on the system data and the mobile tracking data in the local database 244 and/or system database 248.

In block 268, the process 260 may determine if there is a new mobile device in the system 11. The process 260 may determine that a new device has entered the system, for example, by scanning for new devices as described above with respect to FIG. 7F, or based on the mobile devices 22 listed in the local database 244 and/or system database 248. If a new device has been detected by the system ("YES" branch of decision block 268), the process 260 may proceed to block 270, update the mobile device tracking data and/or map to display the newly detected mobile device 22, and proceed to block 272. Updating the data and/or map may include updating the system device time stamps and RSSI values for each mobile device 22 known to the system 11, and presenting the locations of each mobile device 22 to the user on the displayed map. If a new device has not been detected by the system 11 ("NO" branch of decision block 268), the process 270 may proceed directly to block 272.

In block 272, the process 270 may determine if the system user is requesting dwell-time data. If the system user is not requesting dwell-time data ("NO" branch of decision block 272), the process 260 may proceed to block 274. If the system user is requesting dwell-time data ("YES" branch of decision block 272), the process 260 may proceed to block 276 and retrieve the appropriate tracking data from the local database 244. The tracking data retrieved may include the electronic addresses and time-stamped RSSI data of one or more of the mobile device 22 that are in or have been in the system 11, e.g., each mobile device 22 active in the system 11. In block 278, the process 260 may use the retrieved data to determine the dwell-times of the one or more mobile devices 22 and display the dwell-times on the map before proceeding to block 274 The dwell-time of a mobile device 22 may be how long the device has remained in a specified area, e.g., proximate to a specific smart node 12 or group of smart nodes 12, in a region of the system 11 (e.g., a room), and/or in the system 11 itself.

In block 274, the process 260 may determine if the system user is requesting a heat map. If the system user is not requesting a heat map ("NO" branch of decision block 274), the process 260 may proceed to block 280 (FIG. 8B). If the system user is requesting the heat map ("YES" branch of decision block 274), the process 260 may proceed to block 282, retrieve the appropriate tracking data from the local database 244, and proceed to block 284. In block 284, the process 260 may use the retrieved data to determine the RSSI values and locations of the one or more mobile devices 22 and use the RSSI values and locations to determine the heat map. The process may then display the heat map and proceed to block 280. The heat map may provide the system operator with an indication of the strength of the beacon signals verses location in the area covered by the system 11, and/or any other metric that may be determined from the tracking data.

Referring now to FIG. 8B, and with continued reference to FIG. 8A, in block 280 the process 260 may determine if the system user is requesting device tracking. If the system user is not requesting device tracking ("NO" branch of decision block 280), the process 260 may proceed to block 286 and update the system database 248. If the system user is requesting the device tracking ("YES" branch of decision block 280), the process 260 may proceed to block 288. In block 288, the process 260 may select a mobile device 22 to track and proceed to block 290. Selection of the mobile device 22 may be, for example, in response to input from the system operator, e.g., the operator activating an icon representing the mobile device 22 to be tracked that is displayed on a user interface of a computer system. In an alternative embodiment, the mobile device 22 may be selected from a group of mobile devices 22 to be tracked (e.g., all active devices currently in the system 11) based on the electronic address of the mobile device 22, e.g., the mobile device 22 having the lowest valued electronic address in the group of mobile devices 22.

In block 290, the process 260 may retrieve the appropriate tracking data for the selected device from the local database 244, select a time slot (e.g., the earliest time slot covered by the device tracking request), and proceed to block 292. In block 292, the process 260 may check for the presence of RSSI data for the selected mobile device 22 in the selected time slot. If RSSI data exists for the selected mobile device 22 ("YES" branch of decision block 294), the process may proceed to block 296, select the next time slot, and return to block 292. The mobile device 22 may be considered as present in the system 11 if the tracking data includes RSSI data associated with the selected mobile device 22 during the selected time slot. RSSI data associated with the selected mobile device 22 may include, for example, RSSI data for beacon signals received by the selected mobile device 22 during the selected time slot.

If the selected device 22 is not present in the system 11 ("NO" branch of decision block 294), the process may proceed to block 298, determine a path for the selected mobile device 22, and add the path to the map before proceeding to block 300. Determining the path may include determining the location of the selected mobile device 22 in each time slot, and using these locations to plot the path of the device through the area covered by the system 11. If the device was not present during any time slots, the process 260 may determine the path is non-existent, in which case a path for the selected mobile device 22 may not be added to the map.

In block 300, the process 260 may determine if there are any more mobile devices 22 to be tracked. If there are additional mobile devices 22 to be tracked ("YES" branch of decision block 300), the process 260 may proceed to block 302, select the next mobile device 22 to track, and proceed to block 290. If there are no more mobile devices 22 to track ("NO" branch of decision block 300), the process 260 may proceed to block 304, display the tracking map, proceed to block 286, and update the system database 248. Once the system database 248 has been updated, the process 260 may return to block 264.

In addition to the advantages and features described above, embodiments of the invention may also facilitate the setup and commissioning of lighting systems by using a combination of custom mobile device applications and the embedded system hardware, firmware and wireless connectivity of the smart nodes 12. To this end, the system 11 may implement a closed-loop commissioning process in which the mobile application communicates with the system 11 to control the light emitted by one or more of the light fixtures 14 and/or the signal strength of the beacon signals transmitted by the smart nodes 12. Using information gathered by the mobile device 22 and/or sensor modules 18, the application may determine the location of and settings for the light fixtures 14 and present this information graphically to the user.

Figure 9:
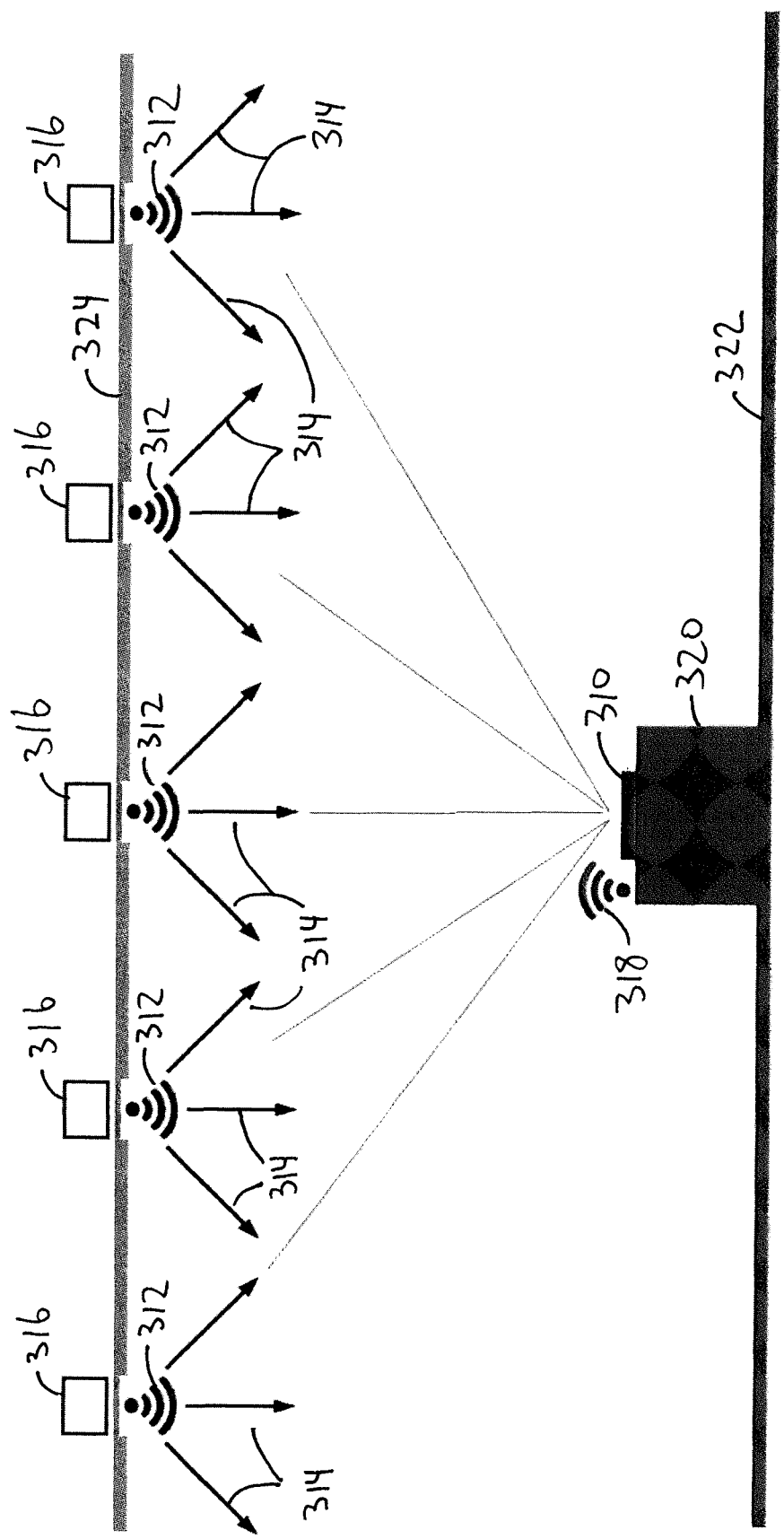
FIG. 9 is a diagrammatic view of a lighting system that is being configured using a mobile device.

FIG. 9 depicts a mobile device 310 running the system setup application and located in a position in which it may receive beacon signals 312 and light 314 from one or more system nodes 316. Each of the system nodes 316 may include one or more of a smart node 12, a light fixture 14, and/or other nodes and/or modules that enable the system node 316 to transmit the beacon signals 312 and output light 314. The mobile device 310 may include a camera or other sensor that determines a light level at the mobile device 310, and a transceiver that receives the beacon signals 312 and transmits data 318 (e.g., in the form of a BLE signal) indicative of the RSSI of the beacon signals 312 and/or light level at the mobile device 310. In operation, the mobile device 310 may be positioned on a table or other support 320 resting on a floor 322 in an area covered by the system 11 being commissioned, and the system nodes 316 may be mounted in a ceiling 324 of the area.

Figure 10A:
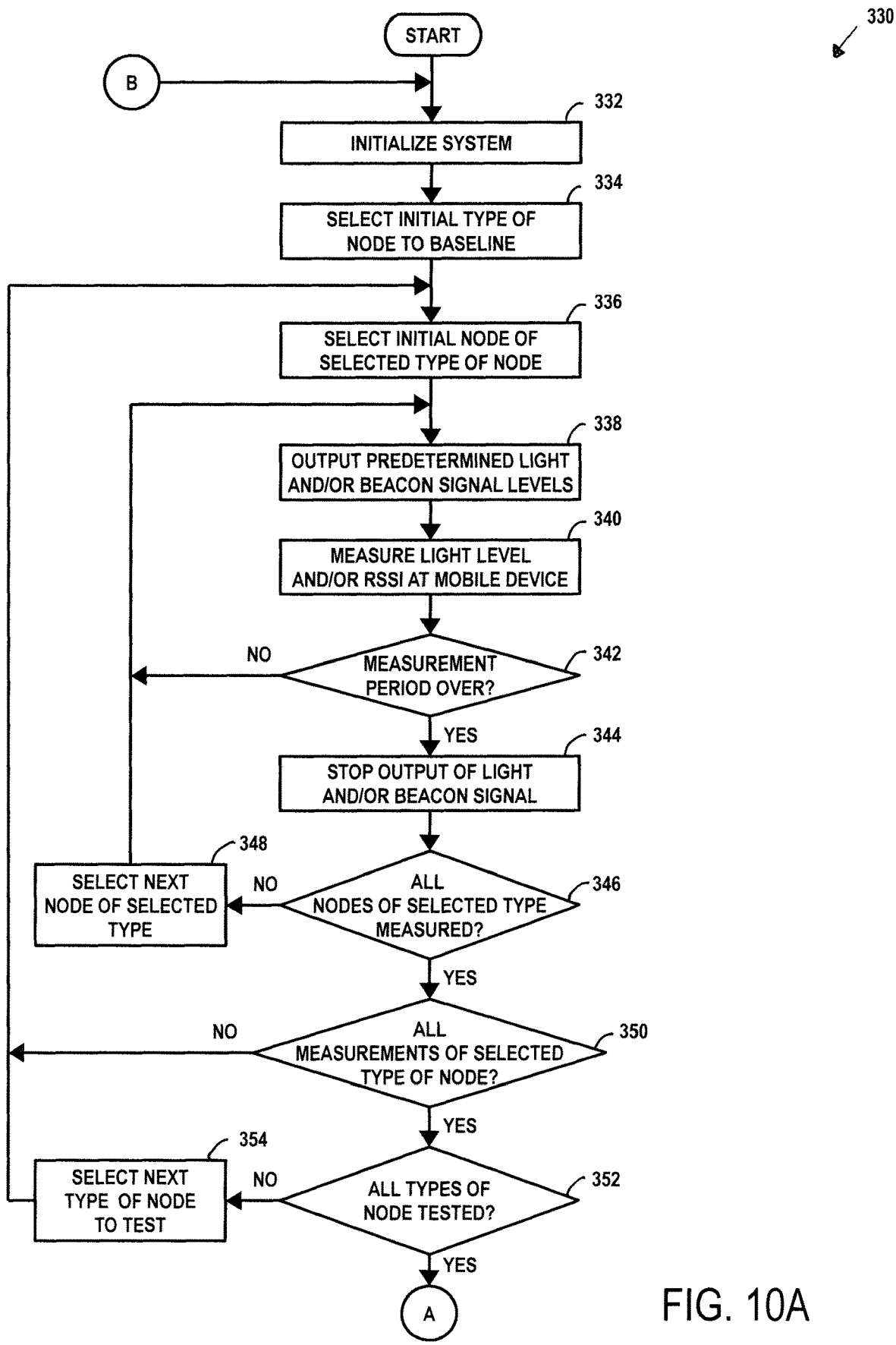
FIGS. 10A and 10B depict a flowchart of a process that may be used for configuring the lighting system of FIG. 9.
Figure 10B:
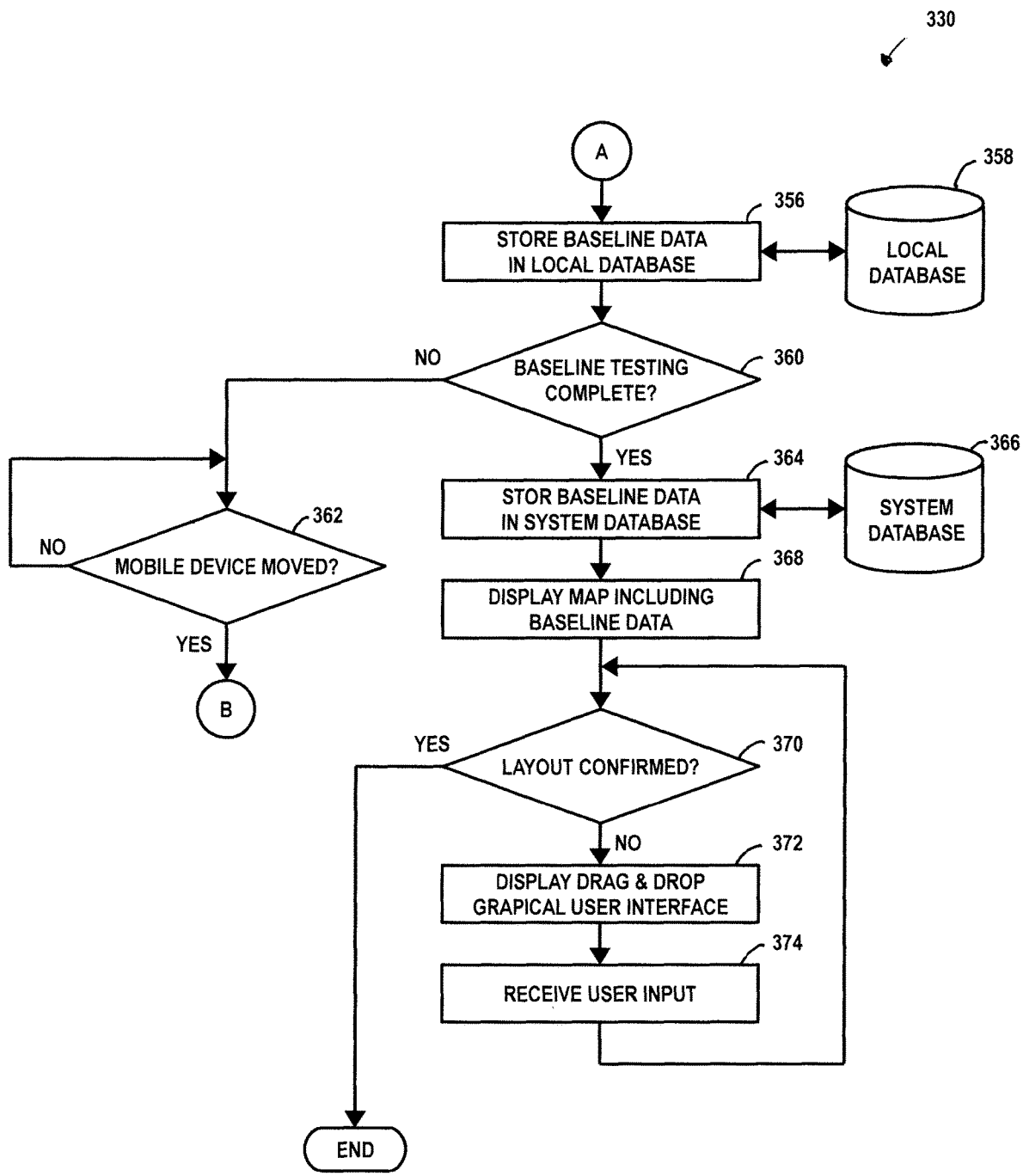

FIGS. 10A and 10B depict flowcharts illustrating a process 330 that may be implemented to configure the system 11 that involves sequentially activating the system nodes 316 and measuring the effects of activating each system node 316 on the environmental characteristics at the mobile device 310 and/or another system node 316. Referring now to FIG. 10A, in block 332, the process 330 may set the system settings to their system default values (e.g., for a first-time system configuration) or restore the settings from a previous backup (e.g., if the system 11 has been configured previously).

Once the system settings have been set, the process 330 may proceed to block 334. In block 334, the process 330 may select an initial type of node from which to obtain a baseline. The selected type of node may be a smart node 12, a light fixture 14, a driver module 16, sensor module 18, control module 20, a combination thereof, or any other type of system node 316 that transmits a beacon signal 312 or outputs light 314. By way of example, types of nodes may include nodes that: both transmit a beacon signal 312 and control the output of light 314 from a light fixture 14; transmit beacon signals 312 but do not control the output of light from a light fixture 14; or do not transmit beacon signals 312 but do control the output of light from a light fixture 14.

Once the initial type of node to be configured has been selected, the process 330 may proceed to block 336, select an initial node of the type of node being configured, and proceed to block 338. In block 338, the process 330 may cause the selected system node 316 to enter an "active mode" during which the system node 316 outputs a predetermined amount of light and/or transmit a beacon signal at a predetermined power level. Causing the system node 316 to enter the active mode may include transmitting a command to the system node 316 that causes the system node 316 to output light and/or transmit the beacon signal at full power. In block 340, while the system node 316 in active mode, the process 330 may cause the mobile device 310 to measure the light level and/or signal level (e.g., RSSI) of the beacon signal 312 at the mobile device 310.

In block 342, the process 330 may determine if the measurement period is over. The measurement period may be a predetermined amount of time, e.g., one second. If the measurement period is not over, ("NO" branch of decision block 342), the process may return to block 338 and continue measuring the light level and beacon signal 312. Taking baseline measurements of the system node 316 may comprise taking one or more readings during the period of time when the system node 316 under test is in the active mode, and using those readings to determine the light level and/or signal level of the beacon signal 312 for the measurement period, e.g., by averaging or integrating the readings.

If the measurement period is over ("YES" branch of decision block 342), the process 330 may proceed to block 344, cause the system node 316 under test to exit the active mode (e.g., by turning off the light and/or beacon signals), and proceed to block 346. In block 346, the process 330 may determine if all the nodes of the selected type have been measured. If not, ("NO" branch of decision block 346), the process 330 may proceed to block 348, select the next system node of the selected type to baseline, and proceed to block 338 to begin the process of measuring the newly selected system node 316. System nodes may be selected, for example, by starting with the system node having the lowest electronic address, and selecting the next highest electronic address once the currently selected system node 316 has been baseline tested.

If all the system nodes 316 of the selected type have been baseline tested ("YES" branch of decision block 346), the process 330 may proceed to block 350 and determine if all the proscribed baseline measurements of the selected type of system node 316 have been completed. For example, the process 330 may be configured to run the baseline measurement multiple times (e.g., ten times) to develop an average light level and/or beacon signal level at the mobile device 310 for each of the system nodes 316.

If all the baseline measurements of the selected type of system node 316 have not been taken ("NO" branch of decision block 350), the process 330 may proceed to block 336, select the initial system node of the selected type of system node 316, and repeat the baseline measurements for the system nodes 316 of that type. If all the baseline measurements of the selected type of system node 316 have been taken ("YES" branch of decision block 350), the process 330 may proceed to block 352 and determine if all types of system nodes 316 have been baseline tested.

If all types of system nodes 316 that are to be baseline tested have not been tested ("NO" branch of decision block 352), the process 330 may proceed to block 354, select the next type of system node 316 to be baseline tested, and return to block 336 to begin baseline testing those system nodes 316. If all types of system nodes 316 that are to be baseline tested have been tested ("YES" branch of decision block 352), the process may proceed to block 356.

Referring now to FIG. 10B, in block 356 the process 330 may store the baseline measurement data in a local database 358. The local database 358 may reside, for example, on the mobile device 310. The baseline measurement data may be stored in the local database 358 as the baseline measurements are being made, or after the baseline testing at the present location has been completed. In either case, the process 330 may then proceed to block 360 and determine if the baseline testing is complete.

If the baseline testing is not complete ("NO" branch of decision block 360), the process 330 may proceed to block 362. In block 362, the process 330 may prompt the user to move the mobile device 310 to a new location. If confirmation that the mobile has been moved is not received ("NO" branch of decision block 362), the process 330 may continue waiting. In response to a confirmation that baseline testing can resume being received ("YES" branch of decision block 362) the process 330 may proceed to block 332 and begin baseline testing with the mobile device 310 in the new location.

In response to baseline testing being complete ("YES" branch of decision block 360), the process 330 may proceed to block 364 store the baseline measurement data in a system database 366. The system database 366 may be external to the mobile device 310, and may allow the baseline measurement data to be accessed by other applications. The system database 366 may reside, for example, on the gateway 26, in the central database 30, and/or on a network database, i.e., in "the cloud".

In block 368, the process 330 may display a map that presents the baseline data. The baseline data may be presented, for example, in a graphical "top-down" view showing a ceiling level layout of the system nodes 316. If the layout is confirmed, such as by the user entering a confirmation into the user interface of the mobile device 310 ("YES" branch of decision block 370), the process 330 may end. If the layout is not confirmed ("NO" branch of decision block 370), the process 330 may proceed to block 372 and display a graphical user interface. The graphical user interface may be configured, for example, to allow the user to change the layout by moving one or more icons representing system nodes 316 on the map using a drag-and-drop gesture. In block 374, the user may use the graphical user interface to input changes to the layout of the system 11. In response to the user entering the changes, the process 330 may proceed to block 370 and attempt to confirm the updated layout.

Although commissioning of the lighting system is described with respect to FIGS. 9, 10A, and 10B as using a mobile device 310 to measure light levels and beacon signal strengths, embodiments of the invention are not so limited. For example, one or more of the system nodes 316 (e.g., a sensor module 18) may include a photodetector and/or transceiver that could be used to take baseline measurements while other system nodes 316 are placed into the active mode. In this embodiment, the system node 316 capturing the baseline measurements may store the measurements locally and/or transmit the measurements to a master node or other computer system that is managing the commissioning process. In addition to gathering baseline data, the process 330 may also adjust one or more settings in the system nodes 316 based on the baseline measurements. For example, in response to determining the measured light level deviates from a designed light level (e.g., the amount or color of the light measured at the mobile device 310 does not conform to a system parameter), the process 330 may change one or more settings in the system node 316 under test to alter the characteristics of its light output until the measured light level is within a predetermined threshold of the designed light level. Likewise, the power level of the beacon signal 312 may be adjusted so that the received beacon signal levels are within a desired range.

Steps involving establishing wireless connections and transmitting data over these connections have generally been omitted from the above described processes 80, 130, 260, 330 for clarity. However, it should be understood that connection error processes may be implemented in accordance with the wireless protocols used. A connection error process may define, for example, a number of retry attempts before aborting an attempt to transmit a data packet or establish a connection. A backup process may also run in the background while the described processes are running that backs up system data in a nonvolatile memory on a periodic basis, e.g., every 200 mS. Further, in response to a system reboot, the system 11 may update the system settings based on a last known backup point.

Figure 11:
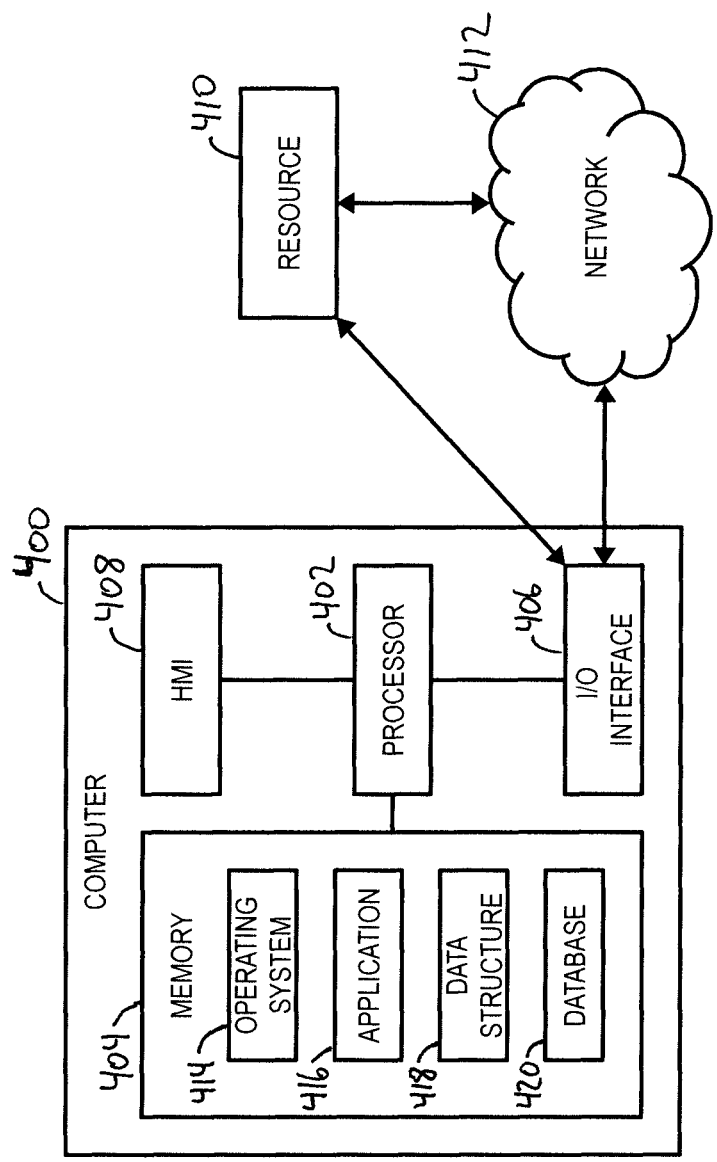
FIG. 11 is a diagrammatic view of a computer that may be used to implement one or more of the components and/or processes shown in FIGS. 1A-10B.

Referring now to FIG. 11, embodiments of the invention described above, or portions thereof, may be implemented using one or more computer systems, such as exemplary computer 400. The computer 400 may include a processor 402, a memory 404, an input/output (I/O) interface 406, and a Human Machine Interface (HMI) 408. The computer 400 may also be operatively coupled to one or more external resources 410 via the network 412 and/or I/O interface 406. External resources may include, but are not limited to, servers, databases, mass storage devices, peripheral devices, cloud-based network services, or any other resource that may be used by the computer 400.

The processor 402 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 404. Memory 404 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, and/or data storage devices such as a hard drive, optical drive, tape drive, volatile or non-volatile solid state device, or any other device capable of storing data.

The processor 402 may operate under the control of an operating system 414 that resides in memory 404. The operating system 414 may manage computer resources so that computer program code embodied as one or more computer software applications, such as an application 416 residing in memory 404, may have instructions executed by the processor 402. In an alternative embodiment, the processor 402 may execute the application 416 directly, in which case the operating system 414 may be omitted. One or more data structures 418 may also reside in memory 404, and may be used by the processor 402, operating system 414, or application 416 to store or manipulate data.

The I/O interface 406 may provide a machine interface that operatively couples the processor 402 to other devices and systems, such as the external resource 410 or the network 412. The application 416 may thereby work cooperatively with the external resource 410 or network 412 by communicating via the I/O interface 406 to provide the various features, functions, applications, processes, or modules comprising embodiments of the invention. The application 416 may also have program code that is executed by one or more external resources 410, or otherwise rely on functions or signals provided by other system or network components external to the computer 400. Indeed, given the nearly endless hardware and software configurations possible, persons having ordinary skill in the art will understand that embodiments of the invention may include applications that are located externally to the computer 400, distributed among multiple computers or other external resources 410, or provided by computing resources (hardware and software) that are provided as a service over the network 412, such as a cloud computing service.

The HMI 408 may be operatively coupled to the processor 402 of computer 400 to allow a user to interact directly with the computer 400. The HMI 408 may include video or alphanumeric displays, a touch screen, a speaker, and any other suitable audio and visual indicators capable of providing data to the user. The HMI 408 may also include input devices and controls such as an alphanumeric keyboard, a pointing device, keypads, pushbuttons, control knobs, microphones, etc., capable of accepting commands or input from the user and transmitting the entered input to the processor 402.

A database 420 may reside in memory 404, and may be used to collect and organize data used by the various systems and modules described herein. The database 420 may include data and supporting data structures that store and organize the data. In particular, the database 420 may be arranged with any database organization or structure including, but not limited to, a relational database, a hierarchical database, a network database, or combinations thereof. A database management system in the form of a computer software application executing as instructions on the processor 402 may be used to access the information or data stored in records of the database 420 in response to a query, which may be dynamically determined and executed by the operating system 414, other applications 416, or one or more modules.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system node for managing a lighting system including a plurality of system nodes, the system node comprising:

one or more processors; and a memory in communication with the one or more processors and storing program code that, when executed by the one or more processors, causes the system node to:

receive an input adjusted power signal from a dimmer that provides the input adjusted power signal with a level of adjustment in accordance with a level of dimming for a first type of light source;

select a mapping function from a plurality of mapping functions based on a second type of light source in another system node;

map the input adjusted power signal to an output adjusted power signal using the selected mapping function by:
analyzing the input adjusted power signal to determine a root mean square value thereof, and
generating the output adjusted power signal that causes the second type of light source to emit an amount of light that would be emitted by the first type of light source receiving the input adjusted power signal having the determined root mean square value, so that the second type of light source outputs light in accordance with the level of dimming set by the dimmer for the first type of light source; and transmit the output adjusted power signal to the other system node.

2. The system node of claim 1 wherein the program code is configured to cause the system node to transmit the output adjusted power signal by:
generating data that defines the output adjusted power signal;
encoding the data into a communication protocol that is compatible with a controller application that resides on the system node; and
transmitting the communication protocol to the other system node.

3. The system node of claim 1 wherein the other system node is a light fixture or a control module.

4. The system node of claim 1 further comprising a transceiver, wherein the system node transmits the output adjusted power signal to the other system node using the transceiver.

5. The system node of claim 4 wherein the one or more processors, the memory, and the transceiver are part of an embedded system.

6. The system node of claim 4 wherein the one or more processors communicates with the other system node through a gateway.

7. The system node of claim 1 wherein the first type of light source is an incandescent light source, and the second type of light source is a solid-state light source.

8. A method of controlling a lighting system, comprising:
receiving an input adjusted power signal from a dimmer that provides the input adjusted power signal with a level of adjustment in accordance with a level of dimming for a first type of light source at a first system node;
selecting a mapping function from a plurality of mapping functions based on a second type of light source in a second system node;
mapping the input adjusted power signal to an output adjusted power signal using the selected mapping function by:
analyzing the input adjusted power signal to determine a root mean square value thereof, and
generating the output adjusted power signal that causes the second type of light source to emit an amount of light that would be emitted by the first type of light source receiving the input adjusted power signal having the determined root mean square value, so that the second type of light source in the second system node outputs light in accordance with the level of dimming set by the dimmer for the first type of light source; and
transmitting the output adjusted power signal from the first system node to the second system node.

9. The method of claim 8 wherein transmitting the output adjusted power signal includes:
generating data that defines the output adjusted power signal;
encoding the data into a communication protocol that is compatible with a controller application that resides on the first system node; and
transmitting the communication protocol to the second system node.

10. The method of claim 8 wherein the second system node is a light fixture or a control module.

11. The method of claim 8 wherein the output adjusted power signal is transmitted from the first system node to the second system node through a gateway.

12. The method of claim 8 wherein the first type of light source is an incandescent light source, and the second type of light source is solid-state light source.

13. A computer program product for controlling a lighting system, comprising:
a non-transitory computer readable storage medium containing program code that, when executed by one or more processors, causes the one or more processors to:
receive an input adjusted power signal from a dimmer that provides the input adjusted power signal with a level of adjustment in accordance with a level of dimming for a first type of light source at one system node;
select a mapping function from a plurality of mapping functions based on a type of light source in another system node;
map the input adjusted power signal to an output adjusted power signal using the selected mapping function by:
analyzing the input adjusted power signal to determine a root mean square value thereof, and
generating the output adjusted power signal that causes the second type of light source to emit an amount of light that would be emitted by the first type of light source receiving the input adjusted power signal having the determined root mean square value, so that a second type of light source in the other system node outputs light in accordance with the level of dimming set by the dimmer for the first type of light source; and
transmit the output adjusted power signal from the one system node to the other system node.

* * * * *

UNITED STATES PATENT AND TRADEMARK OFFICE
CERTIFICATE OF CORRECTION

PATENT NO. : 11,051,386 B2
APPLICATION NO. : 16/562840
DATED : June 29, 2021
INVENTOR(S) : Taylor It is certified that error appears in the above-identified patent and that said Letters Patent is hereby corrected as shown below:

In the Drawings

In FIG. 8A, Block 276 and Block 282, change "RETRIVE" to --RETRIEVE--.

In FIG. 8B, Block 290, change "RETRIVE" to --RETRIEVE--.

In FIG. 10B, Block 364, change "STOR" to --STORE--.

In the Specification

In Column 5, Lines 4-5, change "FIGS. 8A and 8B depict a flowchart of a process that may executed by the smart nodes" to --FIGS. 8A and 8B depict a flowchart of a process that may be executed by the smart nodes--.

In Column 6, Line 52, change "The sensor module 18 generate one or more output signals" to --The sensor module 18 may generate one or more output signals--.

In Column 8, Line 44, change "according the Bluetooth Smart™ protocol," to --according to Bluetooth Smart™ protocol,--.

In Column 14, Lines 22-23, change "the master node may respond with a message that provide an address" to --the master node may respond with a message that provides an address--.

In Column 16, Lines 58-59, change "the process 130 may determine if the commissioning request include any changes to the plug load zones." to --the process 130 may determine if the commissioning request includes any changes to the plug load zones.--.

In Column 16, Lines 62-63, change "determine if the commissioning request includes a request change any of the plug load minimum" to --determine if the commissioning request includes a request change to any of the plug load minimum--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*

In Column 17, Lines 6-7, change "may cause each plug load monitoring modules in the system" to --may cause each plug load monitoring module in the system--.

In Column 17, Lines 26-27, change "the process 130 may determine if the commissioning request includes a request change any of the" to --the process 130 may determine if the commissioning request includes a request to change any of the--.

In Column 19, Lines 28-29, change "electronic addresses and time-stamped RSSI data of one or more of the mobile device" to --electronic addresses and time-stamped RSSI data of one or more of the mobile devices--.

In Column 19, Line 34, change "proceeding to block 274 The dwell-time of a mobile device" to --proceeding to block 274. The dwell-time of a mobile device--.

In Column 21, Lines 43-44, change "outputs a predetermined amount of light and/or transmit a beacon signal" to --outputs a predetermined amount of light and/or transmits a beacon signal--.

In Column 21, Lines 49-50, change "while the system node 316 in active mode," to --while the system node 316 is in active mode,--.

In the Claims

In Claim 12, Column 28, Lines 31-33, change "wherein the first type of light source is an incandescent light source, and the second type of light source is solid-state light source." to --wherein the first type of light source is an incandescent light source, and the second type of light source is a solid-state light source.--.